US012717286B1

(12) United States Patent
Bagschik et al.

(10) Patent No.: US 12,717,286 B1
(45) **Date of Patent: *Aug. 25, 2026**

(54) MODIFYING DRIVING LOGS FOR VALIDATING MODELS

(71) Applicant: Zoox, Inc., Foster City, CA (US)

(72) Inventors: Gerrit Bagschik, Goslar (DE); Matthew David Durasoff, Seattle, WA (US); Tod Cameron Semple, Woodside, CA (US); Nathan David Shemonski, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 400 days.

This patent is subject to a terminal disclaimer.

(21) Appl. No.: 18/081,017

(22) Filed: Dec. 14, 2022

(51) Int. Cl.
*G05B 13/02* (2006.01)
*B60W 60/00* (2020.01)
*G06F 16/23* (2019.01)

(52) U.S. Cl.
CPC ....... *G05B 13/0265* (2013.01); *B60W 60/001* (2020.02); *G06F 16/2358* (2019.01)

(58) Field of Classification Search
USPC .......................................................... 701/27
See application file for complete search history.

(56) References Cited

U.S. PATENT DOCUMENTS

2016/0314224 A1 10/2016 Wei et al.
2021/0004017 A1 1/2021 Colgate et al.
2021/0182577 A1 6/2021 Takami et al.
2021/0279640 A1 9/2021 Tu et al.
2021/0323578 A1* 10/2021 Wang .................. B60W 50/045
2021/0341921 A1 11/2021 Davis et al.
2022/0055641 A1 2/2022 Wolff
2022/0126840 A1 4/2022 Batra et al.

(Continued)

FOREIGN PATENT DOCUMENTS

EP 4036891 A1 8/2022
KR 10-2019-0000843 A 1/2019
WO 2022133090 A1 6/2022

OTHER PUBLICATIONS

Wang, Jing kang, et al."Advsim: Generating safety-critical scenarios for self-driving vehicles", Proceedings of the IEEE/CVF Conference on Computer Vision and Pattern Recognition. (Year: 2021).*

(Continued)

*Primary Examiner* — Adam D Tissot
(74) *Attorney, Agent, or Firm* — EIP US LLP

(57) ABSTRACT

A method is provided comprising receiving log data associated with a vehicle traversing a real-world environment, and inputting the log data into a search algorithm. A first modified value of a first parameter associated with the log data is received from the search algorithm. The search algorithm determines the first modified value based on a first simulation score associated with occurrence of a first event in a first run of a driving simulation. The first run of the driving simulation includes an autonomous vehicle and is based at least in part on the first modified value of the first parameter. The first modified value of the first parameter is output, and may be used for validating or testing a machine learning model such as a machine learning model for controlling an autonomous vehicle.

20 Claims, 10 Drawing Sheets

(56) References Cited

U.S. PATENT DOCUMENTS

2024/0017747 A1* 1/2024 Hasenklever ... B60W 60/00274

OTHER PUBLICATIONS

International Search Report and Written Opinion dated Apr. 3, 2024 for PCT Application No. PCT/US2023/082344.

United States non-final Office Action dated Nov. 5, 2025 for U.S. Appl. No. 18/080,999.

Wang, Jingkang, et al. "Advsim: Generating safety-critical scenarios for self-driving vehicles", Proceedings of the IEEE/CVF Conference on Computer Vision and Pattern Recognition. 2021. (Year: 2021).

United States Final Office Action dated May 5, 2026 for U.S. Appl. No. 18/080,999.

* cited by examiner

MODIFYING DRIVING LOGS FOR VALIDATING MODELS

BACKGROUND

Machine learned models controlling autonomous vehicles can be trained using real-world training data. The training data can represent driving scenarios experienced by a real vehicle traversing an environment or a simulated vehicle traversing a simulated environment. It is important to have a variety of training data to ensure the machine learning model has been trained using a wide range of driving scenarios that the machine learned model may encounter. Equally, it is important to have a variety of driving scenarios to validate or test performance of the machine learning model. Validation/testing can verify that the machine learning model can safely navigate driving scenarios that it will operate within. There is therefore a need to provide training and validation/test data for machine learning models for controlling autonomous vehicles.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
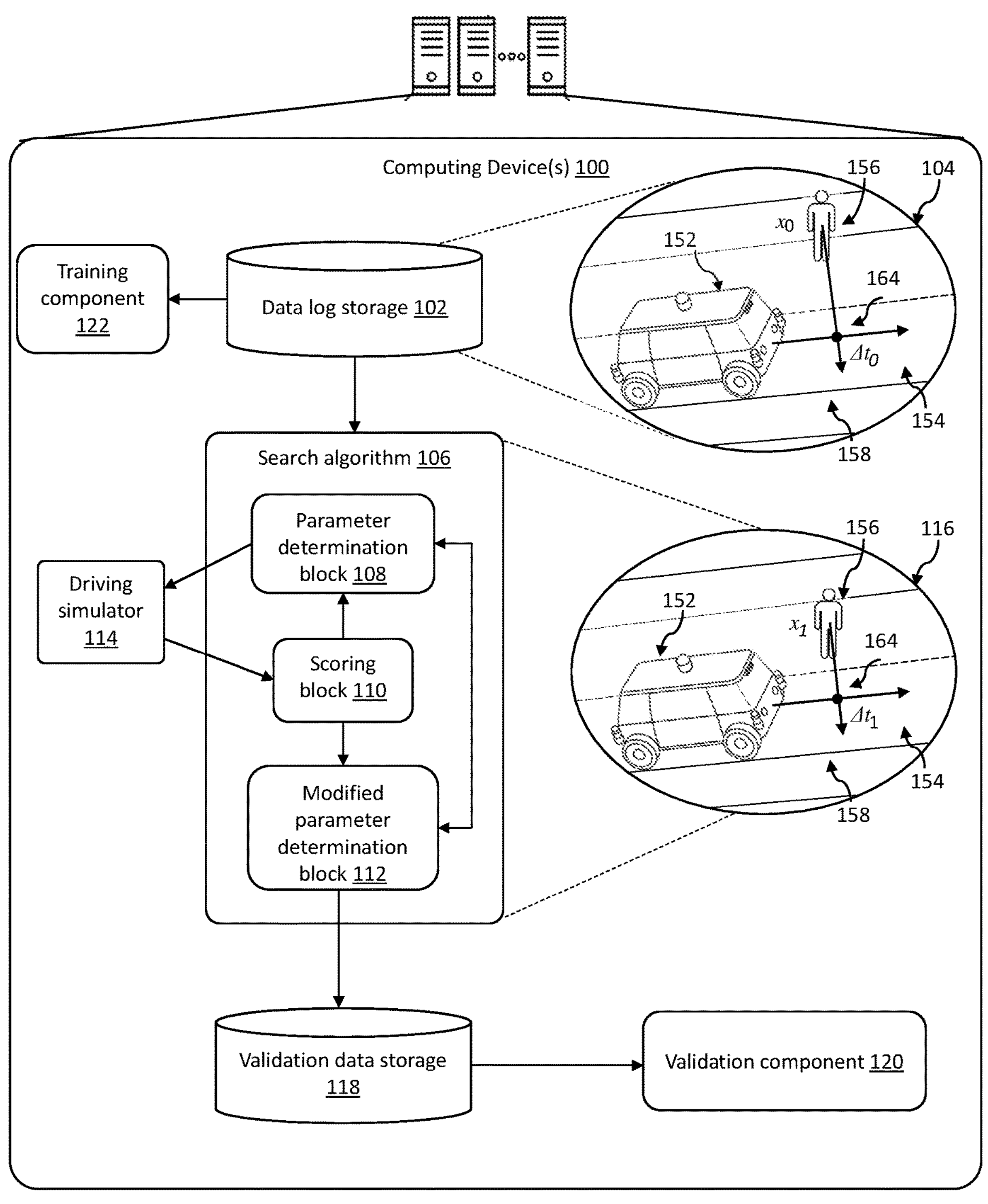
FIG. 1 is a pictorial diagram of a process for generating validation or testing data according to embodiments of the present invention.

This application relates to methods, systems, and computer-readable media that generate training, validation, and/or testing data for training, validating and/or testing machine learned models, such as machine learning models for controlling an autonomous vehicle. The methods, systems, and computer-readable media may vary one or more parameters of or associated with real-world driving log data to generate modified log data. The modified log data may be used as training data, validation data, or testing data. The methods, systems, and computer-readable media may identify a modified value of a parameter of the log data as being associated with a first event. In one example, the first event may be an adverse event between two objects represented in the log data, for example characterized by the overlapping or contacting of the two objects. Thus, for example, a position of an object as recorded in the log data may be varied until a position of the object is found that would have caused, or come close to causing, an adverse event to occur between that object and another object recorded in the log data. In this way modified log data may be generated that is associated with the first event, such as an adverse event. Alternatively, modified values of parameters may be found that generate driving scenarios similar to a driving scenario in the real-world log, which may for example provide further training data similar to the real-world log data. Techniques of the present disclosure may determine which parameter or parameters to modify to generate modified data with the desired proximity to a first event. The first event may be associated with a specific aspect of the environment represented in the first log data. For example the first event may be associated with a specific interaction (or interactions) between objects in the environment, or a specific type of interactions. In particular, the first event may be associated with an interaction or interactions involving an autonomous vehicle. The modified log data may be substantially similar to the original real-world log data, except for the modified parameter(s). This may provide new log data for training/validating/testing, maintaining to a large extent the realism of original log data, but augmenting the real-world training data with additional driving scenarios. The methods, systems, and computer-readable media may identify modified parameters associated with a first event that is relatively rare in the real-world, such as an adverse event. Thus, advantageously, the methods, systems, and computer-readable media disclosed herein may provide more scenarios representative of rare events for training/testing/validating, while maintaining the realism of training/testing/validation data (e.g. in contrast to ab initio generation of simulated driving scenarios). For example, the proportion of rare events in a set of training data may be increased (e.g., the proportion of logs that include rare events or certain rare events can be increased for a dataset for training a machine learned model such as one used for a perception or prediction component). This in turn may improve the performance of the resulting machine learned model and/or autonomous vehicle controlled by such a model when faced with rarer driving scenarios in a runtime environment, and verify that the resulting machine learned model can safely navigate such scenarios.

Techniques of the present invention may train a machine learned model based on the original, real-world log data. The machine learned model may then be validated and/or tested based on modified log data generated from the original log data. The modified log data may provide a modified driving scenario that is similar, yet different, to a real-world driving scenario represented in the real-world log data. Such techniques may allow the trained model to be tested on one or more similar scenarios. For example a driving simulation simulating operation of the machine learning model may be run based on the modified log data. This may provide verification that the model has not been overfit to the specific circumstances of the original log data.

Some techniques may generate a metric descriptive of the machine learning model or the first log data. The metric may be based at least in part on the modified value of the first parameter, or based at least in part on the modified log data.

For example, a metric may be generated representing proximity of the original log data to a first event, such as an adverse event. Such a metric may be representative of how dangerous a driving scenario represented in the log data was. A metric representing proximity of the original log data to a first event may be based on a difference between the modified value of a first parameter and the original value of the first parameter in the real-world data. For example, the difference may be an absolute difference or a relative difference between the two values. Such a difference may represent the extent of change required from the original scenario to reach a first event, such as an adverse event. Where multiple parameters are modified by the techniques discussed herein, the metric may represent the respective change in one or more of the parameters from their respective original values.

In some examples, the metric descriptive of the first log data may be used to identify training data for training a or the machine learning model. For example, if the metric indicates that a driving scenario represented in the first log data is proximal a first event (e.g., came close to an adverse event), the first log data may be identified as training data. In some examples, first log data may be identified based on an initial metric, for example indicating likely usefulness for training (e.g. identifying a driving scenario in the first log data that is likely to be rare). For example an initial metric may comprise a score similar to the simulation score for the first log data. An initial metric may be generated by a heuristic. Modified values of one or more parameters in the first log data may then be modified, as discussed above. From these modified values, a metric descriptive of proximity to the first event may be determined for the first log data. The metric may be used to determine if the first log data is to be used for training a machine learning model. Alternatively, all log data of a group of log data may be tested by such a method to identify real-world log data that is useful as training data. Such techniques may provide a fuller representation of the usefulness of the first log data for training that would be provided by a simple heuristic approach alone. Modified log data generated from the first log data may also identified as training data, or may be used to validate/test a model trained using the first log data.

A metric descriptive of the machine learning model(s) may be associated with performance of the machine learning model when tested in a simulated driving scenario based on the modified value of the first parameter and/or modified log data. The metric may be associated with performance of the machine learning model when tested in a plurality of runs of a driving scenario, each run of the driving scenario based on a respective modified value of a parameter of the original log data (e.g. the first parameter, or another modified parameter). For example, the performance of the each run of the driving simulation may be scored on a binary scale (e.g. pass/fail). The score for a run of driving simulation may be determined based on the machine learning model successfully navigating a simulated driving scenario. For example, a successful navigation may occur if a simulated autonomous vehicle controlled, at least in part, by the machine learning model traverses a simulated environment without occurrence of a safety critical event, such as an adverse event, near collision (e.g. based on proximity of the simulated autonomous vehicle to a simulated object), or a simulated emergency brake operation.

In some examples, a metric descriptive of the machine learning model may be a safety metric. A safety metric may be descriptive of the safety of an autonomous vehicle controlled by the trained machine learning model. A safety metric may for example represent a probability of an adverse event per distance driven.

In some examples, a metric descriptive of the machine learning model may be associated with comfort of a passenger in the autonomous vehicle.

Metrics descriptive of the machine learning model(s) may be used to further train the machine learning model(s). For example, techniques may comprise determining a machine learning model requires additional training based on the generated metric. Techniques may determine, based on the generated metric, that a machine learning model requires additional training associated with a driving scenario or driving scenarios represented in the modified log data associated with the metric. For example, if a metric indicates a low performance of the model against a driving scenario represented in modified log data, it may be determined that the model requires training relating to that driving scenario, or relating to a class of driving scenario associated with the driving scenario in the modified log data. In some examples, the metric may be compared to a threshold. If the metric is below the threshold (or above, depending on the metric), it may be determined that the machine learning model requires additional training. Some examples may comprise determining further modified log data from the first log data that resulted in the metric indicating low performance for a certain scenario. Such further modified logs may be used to train the machine learning model, providing further training examples to augment a training dataset, wherein the further training examples may be similar that are similar to the driving scenario in the first log data.

Some examples may determine a metric descriptive of the machine learning model or a metric descriptive of the first log data based at least in part on the first modified value and an estimated likelihood (or probability) of occurrence of the first modified value in the real-world environment. The estimated likelihood of occurrence may be determined based on values of the first value in additional log data. The additional log data associated with additional objects in the environment. For example, where the first parameter is associated with a first object in a first region (or first location) of the environment, the additional objects may also be associated with the first region (or first location) of the environment. The additional log data may be log data recorded by, or derived from, the same vehicle as the first log data, or different vehicles. The additional log data may correspond to properties of the first log data, such as time of day, time of year, weather conditions, or traffic density. Techniques of the present application may analyze the additional log data to determine a distribution of values of the first parameter observed in the additional log data. For example the distribution may be, or may approximate, a Gaussian distribution. The modified value may be compared to the distribution to determine a likelihood of occurrence. Incorporating a likelihood of occurrence may act as a weighting to ensure that unlikely values of the modified parameter do not unduly skew the metric. For example this may provide a metric that is more representative of the performance of the machine learning model in the real-world.

Some examples may determine respective a first modified value of a first parameter, and a second modified value of a second parameter from the first log data. in such examples, a metric may be determined descriptive of the first log data based at least in part on the first modified value and the second modified value. Where further modified values are generated, the metric may also be based on the further modified values. Some examples comprise defining, based at least in part on the first modified value and the second modified value, and any further modified values, a surface in a parameter space descriptive of proximity of the first log data to occurrence of the first event. The parameter space may be an n-dimensional parameter space. Each dimension of the parameter space may represent a respective parameter. A set of modified parameters output by the search algorithm may be considered to define a coordinate in the parameter space. The surface may represent a range of parameter values associated with the first event. For example, the surface may demonstrate the multi-parameter dependency of the occurrence of the first event. In some examples, the parameter space may be weighted based on a likelihood of values of one or more of the parameters occurring in the real-world. In some examples, a metric descriptive of the first log data may be generated based at least in part on an area of the surface. In some examples, a metric descriptive of the first log data may be generated based at least on an area of the surface a likelihood of values of one or more of the parameters occurring in the real-world.

Some examples may determine respective first modified log data based on a modified value of a first parameter, and second modified log data based on a modified value of a second parameter. Some examples may determine respective first modified log data based on a first modified value of a first parameter generated from first log data, and second modified log data based on a second modified value of the first parameter, or a second parameter, generated from second log data. In such examples, a metric may be determined for a or the machine learning model based at least in part on testing or validating the machine learning model using the first modified log data and second modified log data. For example, the metric may represent a combined performance of the machine learning model in respective runs of a driving simulation based on the first modified log data and second modified log data. Further modified log data may be generated. The metric may also be based on the further modified log data.

Techniques of the present application may constrain the value a modified parameter can take. For example, the modified value of a parameter may be constrained based at least in part on likely real-world values of that parameter. Techniques of the present disclosure may determine a range of values of one or more parameters to be searched. The determination may be based on part in a likelihood of such a parameter occurring in the real world. For example, techniques may identify if a prospective modified value would result in an impossible or unrealistic occurrence, such creating a new overlapping between two stationary objects. Such techniques may seek to provide realistic modified values. This may allow the machine learning model to be trained based on realistic data. It may be important to provide realistic training data, to ensure the machine learning model is training on driving scenarios it is likely to experience in the real-world. Such techniques are discussed further below.

In some examples, techniques of the present disclosure may determine one or more parameters to modify. One or more modified values may then be determined for each of the one or more parameters. For example, techniques may identify one or more parameters as contributing to proximity to occurrence of the first event. Some examples may identify one or more parameters to modify prior to performing a search to determine modified values of said parameters. For example, for a first event or optionally for given first log data, techniques may execute a heuristic to determine parameters likely to contribute to occurrence of the first event. For example, techniques may identify an object that comes within a threshold distance of an autonomous vehicle, and identify a parameter associated with that object. Alternatively or additionally, techniques of the present invention may search a plurality of parameters. For example, in any iterative step of a search, a set of varied parameters may be tested. In any given set of parameters, only one or a sub-set of parameters may be modified from their corresponding real-world values. By testing a variety of such sets of parameters, the search algorithm may automatically determine which parameters should be modified to yield the desired proximity to the first event, and which parameters can retain their original values. Multiple such sets of parameters may be output as respective modified values, providing multiple examples of modified parameters.

As used herein, log data may comprise data gathered by a real-world vehicle, which may be an autonomous vehicle, travelling through a real-world environment. The real-world vehicle may gather data from one or more sensors and may generate a driving log comprising the data gathered from the sensors. In some examples, data may also be generated, either at the real-world vehicle or remotely, based on the sensor data, such as by a localization, perception, planning, or prediction component. The log data may comprise any combination of data gathered from sensors of a real-world vehicle driving in a real-world environment and data generated based on that data, either locally, at the vehicle, or remotely. In some examples, log data may comprise data gathered by one or more static cameras or sensors, one or more unmanned aerial vehicles (UAV), or by other means. The recorded data may comprise information regarding the geography of a given environment, objects in the environment, the location and trajectory of the autonomous vehicle, and the location and trajectory of other vehicles and entities in the environment, as well as data about the status of the vehicle such as engine speed, battery power levels etc. Any data gathered by or created by the autonomous vehicle may be utilized to create log data representative of the movement of the vehicle through the environment, the environment through which the vehicle has moved, and other entities within the environment. In alternative examples, log data may be generated, or partially generated, from simulations of an autonomous vehicle traversing a simulated environment, for example a simulated environment representing a real-world environment.

In some examples, the log data may be pre-processed to convert an object represented in the data into a "smart agent". A smart agent may be a representation of an object that can be controlled, in a driving simulation corresponding to the log data, by a simulated controller. The simulated controller may be configured to control the simulated object based at least in part properties of the simulated environment, such as interactions with other simulated objects. For example, the simulated controller may be a planning component. The planning component may be a planning component of autonomous vehicle, such as that described below in relation to FIG. 10, or may have a more limited functionality to enable scaling of the controller in a simulated overhead with less computational overhead, for example. A smart agent may thus deviate during the simulation from its real-world behavior as represented in the original log data. A smart agent may be contrasted with a "playback agent", which may represent an object in the original log data that is constrained during a driving simulation to following the real-world behavior of the corresponding object in the log data, i.e. without the decision-making capabilities of a smart agent. Techniques for converting playback agents in log data to smart agents are disclosed in US20220269836 A1, which is incorporated herein by reference in its entirety and for all purposes.

In some examples, first log data may be input into a search algorithm. The search algorithm may determine a first modified value of a first parameter in the first log data based on a first score, for example a score descriptive of a predicted driving scenario or a run of a driving simulation. The first score may be associated with occurrence of a first event in a predicted driving scenario, such as a first run of a driving simulation. A predicted driving scenario may represent one or more interactions between objects in the environment as predicted to occur if a modified value of the first parameter had occurred in the real-world. For example, a predicted driving scenario may represent a predicted interaction between two objects if one of those objects was at a modified position compared to the real world. The first score of such a predicted driving scenario may represent proximity to a first event, such as an adverse event, in the predicted driving scenario. In some examples, determining a predicted driving scenario may comprise executing a run of a driving simulation. In other examples, a score may be determined for a predicted driving scenario without executing a run of a simulation. A run of the driving simulation may be an execution of a driving simulation including an autonomous vehicle, and may be based at least in part of the first modified value. The driving simulation may further be based on the log data. Thus a run of the driving simulation may substantially simulate the real-world environment represented in the first log data, but with a different value of the first parameter than occurred in the real-world. During the simulation, the simulated autonomous vehicle may be controlled by an autonomous vehicle controller, such as a planner component discussed further below. The modified log data may be used to train, test, or validate a machine learning model for the autonomous vehicle controller. Methods of providing a driving simulation are discussed in U.S. Pat. No. 10,496,766 B2, which is incorporated herein by reference in its entirety and for all purposes.

In some examples, a run of a driving simulation may only be executed for some attempted modified values of the first parameter and/or only for some parameters that are modified. For other values/parameters, a simpler predicted driving scenario may be determined, for example based on calculations or a heuristic. For example, it may be possible to determine that a particular change in position of an object in the environment would result in an adverse event without executing a full driving simulation. Determining such a simpler predicted driving scenario may be computationally cheaper than running a full simulation. In some examples, techniques determine whether to execute a driving scenario for a given value of the first parameter/given parameter.

In some examples, a driving simulation may be executed to determine a score for a modified value if an object represented in the first log data is to be converted to a smart agent. If no object is converted to a smart agent, a simpler predicted driving scenario may be determined to save computing resources. In some examples, the first parameter may be associated with conversion of an object to a smart agent. For example the first parameter may relate to whether to convert an object to a smart agent or not, and/or at what time during a driving simulation to convert the object to a smart agent. The first parameter may relate to which of a plurality of objects to convert to a smart agent.

In examples, a first intermediate value of the first parameter may be determined. A first predicted driving scenario may be determined (e.g. a first run of the driving simulation may be executed) based, at least in part, on the first intermediate value. A first score may be determined representing the first run of the driving simulation. The first score may be descriptive of proximity to occurrence of a first event in the first run of the driving simulation/first predicted driving scenario. A second intermediate value of the first parameter may then be determined based at least in part on the first score. A second predicted driving scenario (e.g. a second run of the driving simulation may be executed) based at least in part on the second intermediate value, and a second score may be determined. Thus in some examples the first parameter may be iteratively varied, with each varied value being tested by determining a predicted driving scenario, e.g. executing a run of the driving simulation to determine proximity to the first event. Proximity may represent a proximity in space and/or time, for example how close two simulated objects were to overlapping in space and time (e.g. proximity to an adverse event. Proximity may represent proximity in a feature space, e.g. a difference between one or more value of a feature vector and corresponding values representing the first event. Proximity may represent proximity in a reduced space, e.g. an embedding space. Thus in some examples the result of one predicted driving scenario/simulation run may fed back to determine a revised iteration of the value of the first parameter. Such an approach may be considered an example of a directed search. A directed search advantageously may not require information about the gradient of the scoring function. The scoring function may be the function describing proximity to the first event from which the simulation score is calculated, such as functions representing proximity to a vehicle in log data. The gradient of such scoring functions may not be known, or may be computationally costly to determine. Thus searching techniques of the present application may automatically and efficiently search for values of the first parameter that are associated with occurrence of the first event in driving log data. The search algorithm may be any example of directed search algorithm, such as a generalized pattern search algorithm, generating set search algorithm, or mesh adaptive search algorithm. Any suitable scoring function, and corresponding scores, may be used in the techniques described here, based on the particular first event of interest. The scoring function may preferably be continuous over the searched parameter space. For example, the scoring function may represent a proximal-encroachment time between two objects. In some examples, multiple modified values of the first parameter (or multiple sets of modified values of multiple parameters) may be determined from the first log data. For example, a second modified value of the first parameter may be determined. The second modified value may differ from the first modified value by at least a threshold amount. Alternatively, where techniques output a set of modified parameters, a first set of modified parameters may differ from a second set of modified parameters by at least a threshold amount (e.g. representing a minimum distance in a feature space containing the sets of modified parameters). In some examples, already determined modified values are provided to the search algorithm to ensure further modified values are sufficiently different from already determined values. By such techniques, a cluster of modified values may be determined, resulting in a range of modified log data for training the machine learning model.

The first parameter may be associated with an object in the environment, as represented in the first log data. The first parameter, i.e. the parameter or one of the parameters that are modified may represent a geometric attribute of an object in the real-world environment. The geometric attribute may for example be a position, pose, size, or shape of an object. The first parameter may be, or may be associated with a position (e.g. starting position) of an autonomous vehicle (which may be the vehicle recording the log data). For example the starting position may be varied forwards or backwards along the direction of a road segment. The starting position may be varied laterally with respect to a road segment. The first parameter may relate to a position of an object (or plural objects) in proximity to the autonomous vehicle, such as within a threshold distance to the autonomous vehicle. The first parameter may relate to a position of a stationary object, such as a parked vehicle (e.g. moving parked vehicle laterally further into a road). The first parameter may relate to a change of shape of an object, for example a parked vehicle opening a door. Parameters may include initial parameters of an object (e.g., an initial position, velocity, acceleration, steering angle, orientation, vehicle classification (e.g., car, truck, etc.), dimensions).

The first parameter may also represent a dynamic attribute of an object traversing the environment. For example the first parameter may represent a speed, acceleration, rate of turn, or angular acceleration of an object such as the autonomous vehicle. For example, an initial speed of an autonomous vehicle at the start of a driving scenario in the first log data may be modified. The first parameter may be associated with metadata associated with an object in the environment. For example metadata may comprise parameters descriptive of the object determined based on measurements taken by the vehicle traversing the parameter, rather than being directly measured by sensors of the vehicle. For example, metadata may be determined by applying image analysis to one or more images captured by the vehicle. For example, the metadata may relate to whether an object in the environment is indicating, has a taillight out, or is holding a cell phone. Metadata may relate to behavioral attributes of an object, such as how aggressive a driver of a vehicle is. The first parameter may be an environmental attribute. For example the first parameter may represent a weather condition, such as rainfall, visibility, or weather-based road conditions such as a presence of water or ice on the road surface. The first parameter may be a map attribute, for example descriptive of the shape or size of a road such as representing a number of lanes on a road, a width of a lane, or camber of a road surface. The first parameter may be a temporal attribute, e.g. changing the time at which an event occurs, or changing the time at which an object arrives at a point. The first parameter may relate to a starting time of a driving scenario (e.g. at what point in a data log to start a simulation).

The first parameter may be associated with a smart agent. That is, the first parameter may be associated with an object in the environment that is controlled in the runs of the driving simulation in accordance with a planning component. Such a smart agent may be initialized in a run of the driving simulation based on a modified value of the first parameter. The value of the first parameter may subsequently vary during the simulation run in accordance with decisions made by the planning component in the simulation. Advantageously, such techniques may allow smart agents to react to the modified value of the parameter, and so the resulting score representing proximity to the first event may be based on reactions of an agent to the modified value of the first parameter. This may be useful for scenarios where the change to the first parameter, if replicated in the real-world, would likely lead to changed reactions of agents such that an adverse event is made less (or more) likely than if the original actions of the agents was simply played back in the simulation. As discussed above, in some examples the first parameter may relate to whether one or more objects are converted to smart agents, or are retained as playback agents.

In other examples, the first parameter may be associated with a playback agent. That is, the first parameter may be associated with an object that, in the runs of the driving simulation, is operated in accordance with the real-world data except for the modified value of the first parameter. Such examples minimize the artificial changes made to the original driving log data, particularly where the modification to the first parameter is relatively small. This may contribute to generating training data that is a close approximation of the original real-world environment, which may increase the likelihood that the generated modified training data is a realistic scenario to train the machine learning model on.

In some examples, the first parameter may be associated with the vehicle traversing the environment with which the first log data is associated. For example the vehicle may be an autonomous vehicle. The first log data may be recorded by the vehicle, and/or may be derived from measurements recorded by the vehicle. In runs of the driving simulation, this vehicle may be represented by a simulated autonomous vehicle. The first parameter may for example be associated with a position of this vehicle, or a time of arrival of this vehicle at a location.

The first event may be, or may be associated with, an adverse event. The first event may be an adverse event between a first object and a second object in the environment. The first object may be the autonomous vehicle, another vehicle, a pedestrian, or any other moving object in the environment. The second object may be a moving object, or may be a stationary object. The first event may relate to particular types of collision. For example, the first event may relate to collisions (or any other event). In other examples, the first event may be associated with comfort of a passenger of a vehicle. For example, the first event may be associated with a comfort metric indicating likely discomfort of a person. In such examples the scoring function may represent the comfort (or discomfort) of a simulated passenger of a vehicle in the driving simulation. For example, comfort may be represented as the jerk a passenger would experience. In such cases the search algorithm may seek to maximize the simulation score, representing a maximum discomfort for the passenger. In other examples the first event may relate to a reaction of a first object in the environment to an action of a second object in the environment. The first object may be represented in the runs of the driving simulation by a smart agent. For example the first event may be associated with a vehicle braking, or braking with a rate of deceleration higher than a predetermined threshold, due to an action of a different vehicle. This may for example relate to dangerous maneuvers performed by the second vehicle.

The score (e.g. simulation score) may represent the output of a scoring function applied to a respective run of the driving simulation/predicted driving scenario. The scoring function may be based on the first event. For example, where the first event is an adverse event between a first object and a second object, the scoring function may be, or may be associated with, a proximal-encroachment time, such as a pre- or post-encroachment time. A proximal-encroachment time may represent a time span between arrival of the first object at a first location and arrival of the second object at the first location. A zero proximal-encroachment time may represent an overlap between a trajectory of the first object and the trajectory of the second object, i.e. an overlap of the two objects in space and time. In examples, techniques of the present application determine a proximal-encroachment time for all pairs of interacting objects in a simulation run, or a sub-set of pairs of interacting objects in the simulation run. A pair of interacting objects may be any pair of objects whose trajectories overlap during the simulation run. Techniques may determine a proximal-encroachment time only for an interaction or interactions involving a first object associated with the modified first parameter. The sub-set of pairs of interacting objects may for example comprise the autonomous vehicle and objects that come within a predetermined distance of the autonomous vehicle during the simulation run. A proximal-encroachment time may be determined for interactions comprising three or more objects. In other examples, where the first event relates to comfort of a person in a vehicle, the scoring function may be associated with a comfort metric, for example relating to the jerk experienced by a person in a vehicle, and particularly by a person in the autonomous vehicle. The scoring function may be associated with a safety, progress, and comfort metric. A safety, progress, and comfort metric may be descriptive of a maneuver by the autonomous vehicle. A safety, progress, and comfort metric may be descriptive of how safe a maneuver is, how much the maneuver progresses the vehicle along a planned trajectory, and how comfortable the maneuver is for a passenger of the vehicle. Other scoring functions may be used depending on the first event of interest, as will be appreciated by the skilled person.

In some examples the score (e.g. a simulation score describing a run of a driving simulation) may be compared to a threshold condition. If the score meets the threshold condition, the corresponding intermediate value of the modified parameter may be output as a modified value, for example for use in generating modified log data. The threshold condition may be associated with a corresponding score generated for the first event. For example, a score may be determined representing proximity to the first event of a driving scenario represented in the first log data. The threshold condition may then be based on said score for the real-word first log data. The threshold condition may specify an upper and/or lower bound for a score for an intermediate value for that intermediate value to be output as the or a modified value. Thus in some examples, the threshold condition may represent a range of scores that are similar to the corresponding score of the first log data. Such examples may result in modified values of parameters, and hence modified log data, that result in driving scenarios with a similar proximity to the first event as occurred in the real-world log data. Such techniques may advantageously provide additional examples for training data that are similar to the driving scenario represented in the first log data. In other examples, the search algorithm may seek to optimize the score. The value of the first parameter that results in the optimized score may then be output as the modified value of the first parameter, from which modified log data may be generated. In particular examples, the search algorithm may seek to minimize the scoring function. The search algorithm may determine a next intermediate value of the first parameter to try based on scoring functions from one or more previous intermediate values. For example, if incrementally increasing the value of the first parameter has resulted in incrementally decreasing simulation scores, the search algorithm may continue to increase the value of the first parameter until a minimum simulation score is found. The search algorithm may determine multiple values of the first parameter that optimize the simulation score. The search algorithm may concurrently search for values of one or more further parameters that are associated with the first event. For example the search algorithm may vary a position of multiple objects in the environment.

In some examples, techniques discussed herein determine a first parameter range for the first parameter. The first parameter range may limit the values of the first parameter that can be determined by the search algorithm. In other words, the first parameter range may be a constraint on the search algorithm defining permitted values of the first parameter. In some examples, the first parameter range limits only an initial intermediate value of the first parameter determined by the search algorithm. The initial intermediate value may be the first value of the parameter that is determined and used to execute a driving simulation. In such examples, the value of the first parameter may deviate from the first parameter range for subsequent intermediate values, such that the ultimately determined modified value need not lie in the first parameter range. In other examples, the first parameter range restricts the value of the first parameter throughout the search process, such that the modified value must lie in the first parameter range.

In some examples, the first parameter range is based on a predetermined maximum deviation from the actual value of the first parameter in the first log data. The maximum deviation may be an absolute change, or a relative change such as a percentage change. For example, the maximum deviation may be a 1% change, 5% change. 10% change, 15% change, or 20% change from the original value. Such techniques may limit the possible change in the first parameter to only a small deviation, constraining the resulting modified log data to a close, and hence likely more realistic, approximation of the original first log data.

The first parameter range may be determined based at least in part on values of the first parameter in additional log data associated with additional objects in the environment. For example, where the first parameter is associated with a first object in a first region (or first location) of the environment, the additional objects may also be associated with the first region (or first location) of the environment. The additional log data may be log data recorded by, or derived from, the same vehicle as the first log data, or different vehicles. The additional log data may correspond to properties of the first log data, such as time of day, time of year, weather conditions, or traffic density. Techniques of the present application may analyze the additional log data to determine a range of values of the first parameter observed in the additional log data. The first parameter range may be, or may be based, on said range of values. In one illustrative example, the first parameter may relate to speed of a first vehicle entering a junction. The additional log data may be analyzed to determine the range of speeds other, real, vehicles have entered the same junction at previously. The search algorithm may then be used to determine a modified speed of the first vehicle associated with the first event, but taking values only from the observed real-world range. This may provide realism to the modified value, and hence the generated log data.

Additionally or alternatively, the first parameter range may be determined based on map data or an environmental attribute associated with the environment. For example, the map data may relate to road size, shape, or curvature, or a type, size, or shape of a junction in the environment. The map data may relate to a known property of the road, such as a speed limit. The environmental attribute may relate to a weather condition.

In general, the first parameter range may be determined based at least in part on an estimated likelihood of the values of the first parameter occurring in the real-world environment. For example, statistic values such as mean value and standard deviation may be determined for the first parameter based on additional log data. The first parameter range may then be determined based on said mean value and standard deviation. For example, the first parameter range may comprise a first number of standard deviations below the mean to a second number of standard deviations above the mean value. The first and/or second number may for example be 1, 2, 3, 4, or any other number. In some examples, determining the first parameter may comprise determining the statistical values from the additional log data. In other examples determining the first parameter may comprise retrieving previously determined statistical values relating to the first parameter.

In some examples, the first parameter range may be determined in least in part based on identifying if a modified value would result in a rejection event. A rejection event may relate to a physically impossible or improbable occurrence caused by the modified value. For example, if a modified value would result in a new physical overlap between two objects that could not overlap in the real world, that value may be rejected as being impossible. As such, it may be excluded from the first parameter range. Alternatively or additionally, each iterative step of the search an intermediate value may be analyzed to determine if it would result in a rejection event. In some examples, such analysis may be performed before a simulation is executed based on that intermediate value. In the example of new physical overlap between two objects, techniques may be able to identify such an overlap based on physical principles, without having to run a computationally costly simulation. If a rejection event is detected, the value may be rejected as a possible modified value without performing a simulation. In other examples, a simulation may be run based on an intermediate value. A rejection event may be based on heuristics or other rules which may indicate if a modification to an attribute results in an unrealistic situation. For example, an object's velocity may be modified by an amount that results in an unrealistic object action (e.g., a vehicle stopped or excessively slow on a highway when a vehicle behind it is traveling faster which may result in an overlap of objects directly proceeding the beginning of a simulation, for example, in an unrealistic manner). The rejection rules may include rules to avoid overlaps as disclosed previously, rules to avoid threshold values of parameters or combinations of parameters, rules that take into account surrounding objects or traffic rules (or traffic signs or lights), etc. In some examples, the amount that a parameter is modified can be based on a distribution of values for that parameter in similar scenarios in log data (e.g., for all logs that include a similar type of object/scenario combination, such as a semi-truck performing an unprotected left turn). In this manner, a collection of modified scenarios may be generated for training or validation of machine learned models for use with autonomous vehicles.

If occurrence of a second event is observed in a run of the driving simulation, the respective intermediate value of the first parameter for run is rejected. For example, the second event may be associated with a new physical overlap of two objects, or an event that is not physically possible in the real-world environment. If such an event is detected, the respective intermediate value is not taken to be the modified value, even if it is the value that optimizes the simulation score.

Such techniques may provide a modified value of the first parameter that represents a realistic value the first parameter might take. This may improve the realism of the resulting modified log data, and hence the usefulness of the log data for training the machine learning model.

Accordingly, techniques (including, but not limited to, a method, a system, and one or more non-transitory computer-readable media) may be provided as discussed herein.

Figure 2:
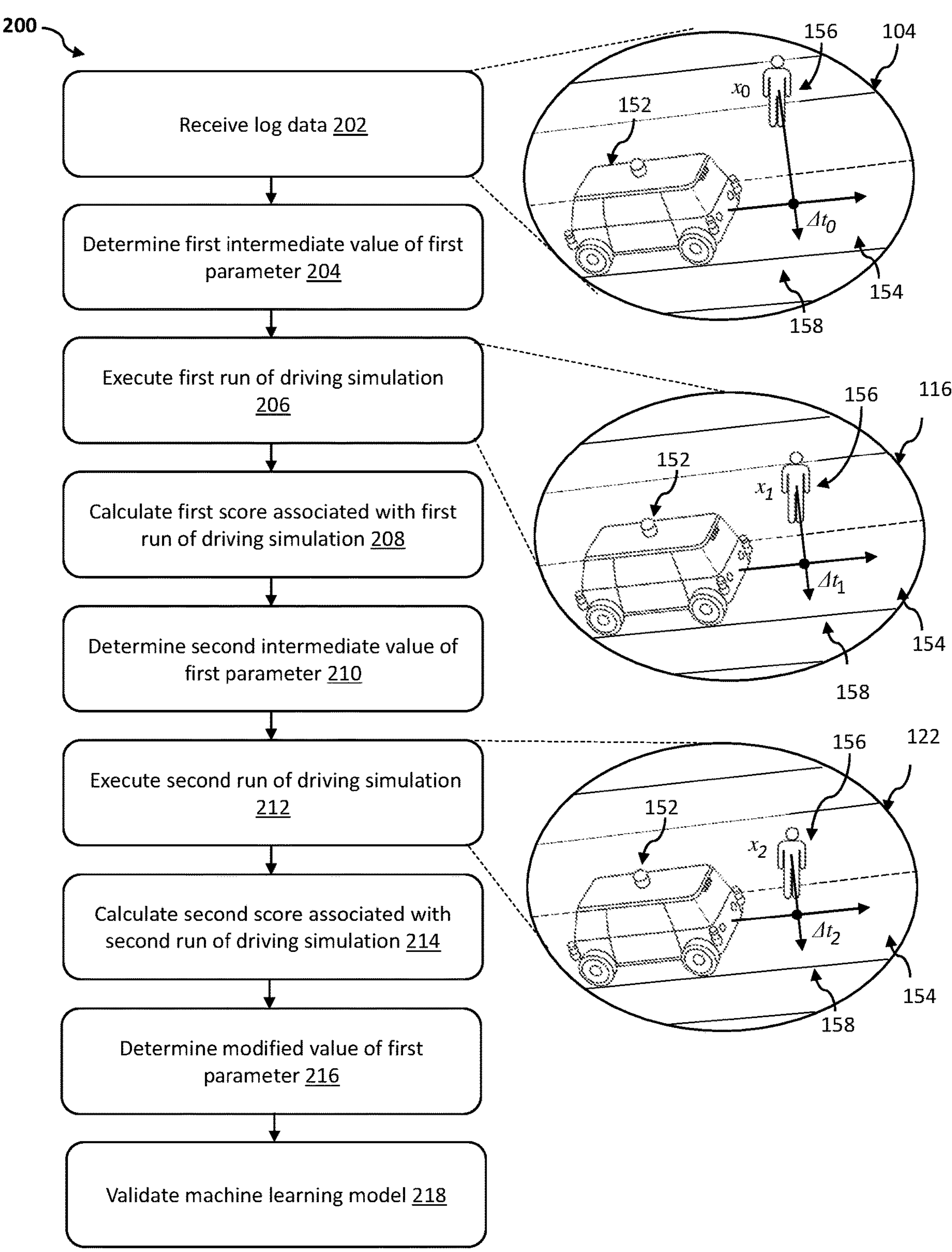
FIG. 2 depicts a flow chart of the process for generating validation or testing data according to embodiments of the present invention.

FIGS. 1 and 2 illustrate a first example of the invention. FIG. 1 illustrates an example a computing device 100, comprising the components and logical blocks discussed below. It is to be noted that although these components and blocks are shown as distinct elements, they may be implemented as operations performed by a processor of the computing device 100, and as memory elements of memory associated with the computing device 100.

Computing device 100 may comprise a memory storing log data, represented in FIG. 1 by data log database 102. Data log database 102 may store one or more data logs received from one or more vehicles traversing real-world environments, and/or derived from measurements of the real-world environment. Each data log comprises values of parameters describing the real-world environment as the vehicle passed through the environment. For example, a first parameter of a first data log may be associated with an object, for example specifying its position in the environment at a particular point in time. The log data may be measured by sensors of the vehicle traversing the real-world environment, or may be derived from such measurements.

A scene associated with example first data log 104 stored in the data log database 102 is illustrated in FIG. 1. The illustrated scene represents the actual real-world environment that the data of the first log data describe. In this example, a first vehicle 152, which in this example is an autonomous vehicle, is depicted as travelling on a road 154. A pedestrian 156 is crossing the road 154 from a first sidewalk to a second sidewalk 158 adjacent to the road 154.

The first vehicle 152 may comprise one or more sensors 162. The sensors 162 may gather sensor data relating to the environment, and particularly in relation to the environment in which the first vehicle 152 is travelling, and the pedestrian 156. The first vehicle 152 may include one or more sensors that monitor its own operation. If other vehicles, pedestrians, or objects, such as street furniture, street markings, and static vehicles, were present in the vicinity of the vehicle, the sensors 162 may gather data in relation to these features. The first log data 104 contains data measured by the sensors 162, and data derived therefrom. Data logs recorded by the first vehicle 152 may be stored in memory (not shown) of the first vehicle 152. Computing device 100 is remote from the first vehicle, and receives data logs from the first vehicle 152 in any suitable way. In examples, log data for a journey may be provided as a packet of data sent from the first vehicle 152 once the first vehicle 152 has completed a journey (i.e. stopped at a predetermined location or stopped for a predetermined amount of time). In other examples, log data from multiple different journeys may be sent to the remote computing device(s) 100 at a convenient time. For example, the vehicle 152 may send the data to the remote computing device(s) 100 periodically, such as at a predetermined time each day or each week. In other examples, the vehicle 152 may stream the data to the remote computing device(s) 100 in real time, which may compile and store the data in memory, as represented by data log database 102 in FIG. 1. In some examples, the remote computing device(s) 100 may be configured to query the vehicle 152 or another computing device at which log data is stored to retrieve the data.

In the illustrated example first log data 104, the pedestrian 156 is at a position $x_0$ at a first time instance, and is crossing the road 154 as the first vehicle 152 travels along the road 154. The trajectories of the pedestrian 156 and the first vehicle 152, illustrated in FIG. 1 by arrows extending from the respective object 152, 156, therefore overlap and a first location 164. However, because of the position $x_0$ at which the pedestrian 156 starts, the speed of the pedestrian 156, and the position and speed of the first vehicle 152, the pedestrian 156 and first vehicle 152 do not collide. The first vehicle 152 passes through the first location 164 before the pedestrian 156 arrives at the first location 164. The time difference between the time at which the first vehicle 152 passed the first location 164 and the time at which the pedestrian passes the first location 164 may be referred to as a proximal-encroachment time. In the first log data 104, representing the real-world, the proximal-encroachment time is $\Delta t_0$. The proximal-encroachment time provides a measure of how close two objects came to an adverse event, e.g. overlapping at the same position in space at the same time.

In the real-world scenario, there was no collision between the pedestrian 156 and the vehicle 152. However, computing device(s) may seek to find values of a first parameter of the first log data 104 that may have resulted in an adverse event, or may have come close to causing an adverse event. The computing device(s) may seek to find values of the first parameter that result in a similar proximity to a first event as in the first log data. The computing device(s) may seek to identify which of a plurality of parameters to modify to obtain the desired proximity to the first event. In the illustrated example, the first parameter may be the starting position x of the pedestrian 156. Varying parameters to find collisions, or near-collisions, may provide new driving scenarios with which machine learning models controlling an autonomous vehicle, such as first vehicle 152, may be trained.

The first log data 104 may be passed to a search algorithm 106. The search algorithm 106 may determine a modified value of the first parameter by performing a search operation. For example, search algorithm may perform a directed search.

Search algorithm 106 may comprise a parameter determination block 108. Parameter determination block 108 may determine intermediate values of the first parameter to be tested. Upon receiving the first log data 104, the parameter determination block 108 may determine an initial intermediate value of the first parameter. For the illustrated example of pedestrian 156 starting position, the parameter determination block 108 may determine the initial intermediate value of to be $x_1$, differing from the true value $x_1$ in the real first log data 104. In some examples, multiple parameters may be available to be modified by search algorithm 106. For example, a set of parameters may be provided to the search algorithm, including for example five or more, ten or more, or twenty or more parameters to investigate. Search algorithm 106 may determine which parameters to modify. For example, search algorithm 106 may determine one or more parameters that contribute to proximity to occurrence of the first event (e.g. parameters that make an adverse event more likely). For each parameter to be modified, search algorithm 106 may perform independent searches for one or more modified values based on proximity to the first event. Alternatively, at each iterative step, parameter determination block may determine a set of modified values of plural parameters. In any given intermediate set of values, only a sub-set of parameters may be modified, with other parameters having their original value. The search algorithm 106 may assess each intermediate set of values collectively, determining one or more sets of modified values which are associated with occurrence of the first event. In any output modified set of values of multiple parameters, one or more of the parameters may have their original, unmodified value. By this iterative approach, the search algorithm 106 may determine which parameters to vary, and which do not contribute to occurrence of the first event and so can be left unmodified.

In some examples, the intermediate value determined by the parameter determination block may be passed to a driving simulator 114. Driving simulator 114 may execute a run of a driving simulation based at least in part on the intermediate value of the first parameter received from the parameter determination block 108. The driving simulation may simulate objects in a simulated environment in accordance with input parameters. The driving simulation may simulate an autonomous vehicle moving in the simulated environment. The autonomous vehicle may be controlled by one or more machine learned models corresponding to models that control a real-world autonomous vehicle, such as a planner component discussed below.

A run of the driving simulation executed by the driving simulator 114 may further be based on the first log data 104. For example, a run of the driving simulation may simulate an environment that substantially corresponds to the real-world environment represented in the first log data 104. For example, first log data 104 may comprise the first parameter and further parameters. A run of the driving simulation may be based (at least initially) on the real values of the further parameters, and the respective intermediate value of the first parameter. The further parameters may represent 50% or more, or 70% or more, or 90% or more, or 95% or more of the parameters in the first log data 104 describing the real-world environment. Thus, a run of a driving simulation may closely resemble the real-world driving scenario represented in the first log data 104, with only the parameter(s) modified by the search algorithm 106 changing relative to their ground truth values in the first log data 104.

An example initial run 116 of the driving simulation is illustrated in FIG. 1. The initial run 116 is based at least in part on the initial intermediate value of the first parameter. Thus, for example, the pedestrian 156 may start at position $x_1$, as illustrated. The initial run 116 simulates, amongst other things, movement of simulated objects in the simulated environment. Some simulated objects are controlled to correspond or substantially correspond with movement of the corresponding object in the first log data 104. Such objects may be referred to as "playback agents". For example, an object may be described in the first log data by one or more parameters. The simulated version of said object may be controlled based on 50% or more, or 70% or more. 90% or more, 95% or more, or 100% of said one or more parameters. For example, a trajectory of a simulated object may match the real trajectory of that object in the real-world. In the illustrated example, the simulation pedestrian 156 may be a playback agent. The pedestrian 156 may be controlled to walk across the road 154 with a trajectory matching the real trajectory of the pedestrian 156 in first log data 104, except for the modified starting position, $x_1$.

Other objects in the simulated environment may be able to deviate from the behavior of the corresponding real-world object. Such objects may be referred to as "smart agents". A smart agent may be controlled initially to correspond with the matching object in the first log data 104. However, said object may subsequently be controlled using a machine learned model, such as a planning component. Thus a smart agent may react differently to its real-world counterpart, for example reacting to changes introduced by the modification of the value of the first parameter. Similarly, an autonomous vehicle may be simulated based on initial parameters, such as a starting position, but may subsequently be controlled in accordance with a simulated planning component reacting to the simulated environment.

In the illustrated example, the simulation of first vehicle 152 may be controlled as a simulated autonomous vehicle. Thus the first vehicle 152 may, for example, be simulated in accordance with a starting position, speed, acceleration etc. based on the first log data 104. Subsequently, however, the movement of first vehicle 152 may deviate from that observed in the real world.

The initial run 116 of the driving simulation may be analyzed by a scoring block 110 of the search algorithm 106. Scoring block 110 may determine an initial score (also referred to herein as a simulation score), corresponding to the initial run 116 of the driving simulation (or, as described below, corresponding to a predicted driving scenario determined without executing a simulation). The simulation score may be descriptive of proximity to a first event in the initial run 116 of the driving simulation. As in the illustrated example, the first event may be an adverse event between two objects in the simulated environment for example characterized by an overlapping of the two objects in space and time. For example, scoring block 110 may analyze an interaction between a first simulated object and a second simulated object to determine a proximal-encroachment time for between the first simulated object and the second simulated object. The scoring block may determine a score, such as a proximal-encroachment time, for all interactions between objects in the simulated environment. The scoring block may determine a score, such as a proximal-encroachment time, for a sub-set of interactions between objects in the simulated environment. For example, a score may be determined for interactions involving the simulated autonomous vehicle (here the first vehicle 152), or interactions within a predetermined distance of the simulated autonomous vehicle. The first event may be associated with an interaction between a specified object and one or more other objects. For example the first event may be associated with an interaction between an autonomous vehicle and other objects in the environment. The first event may be associated with a specified type of interaction, for example relating to an adverse event likely to cause injury.

Thus, in the illustrated example, the scoring block 110 may determine a proximal-encroachment time between the first vehicle 152 and the pedestrian 156 in the initial run 116 of the driving simulation. In this example, the pedestrian 156 has a starting position of $x_1$, which is closer to the first vehicle 152 than in the real-world equivalent. The proximal-encroachment time, $\Delta t_1$, between these two objects will therefore be smaller than that represented in the first log data. Therefore, the change in the value of the first parameter to the initial intermediate value may have reduced the simulation score relative to the real-world equivalent.

In some examples, the scoring block 110 may generate a single simulation score for a respective run of the driving simulation. For example, the score may represent a single interaction in the simulated environment, such as the proximal-encroachment time between the first vehicle 152 and pedestrian 156. Where there are multiple interactions in the simulated environment, or multiple interactions involving the autonomous vehicle, the simulation score may represent the most optimized score from said interactions. The most optimized score may be the highest or lowest score for an individual interaction in the simulated environment. For proximal-encroachment time, lower scores are more optimized that higher scores. In other examples, the scoring block may generate a single score representative of multiple interactions, such as an average of each individual interaction score.

In some examples, the score may be based both on proximity to occurrence of the first event and on a likelihood of a driving scenario represented by the first log data, as modified based on the intermediate value, occurring. Such a likelihood may be referred to as an exposure. An exposure for a given driving scenario may be based on observations of the same or similar driving scenario in recorded data logs measured from real-world environments. A more likely driving scenario may scored 'better', for example yielding a lower score where a lower score represents an optimum result. Methods of determining exposure for a driving scenario are provided in U.S. Ser. No. 17/880,935, filed Aug. 4, 2022 and titled "SYSTEMS AND METHODS FOR INGESTING DATA BASED ON PREDEFINED DRIVING SEQUENCES", which is incorporated herein by reference in its entirety for all purposes.

In some examples, an intermediate value determined by parameter determination block 106 may not be tested in a driving simulation. In particular, in some examples, it may be possible to determine a score (equivalent to the simulation score) directly from the intermediate value of the first parameter, and (unmodified) values of other parameters. For example, if the first parameter relates to a changed position of an object, it may be possible to determine that an adverse event would have occurred (e.g. overlap of a moving object and another object) based only on physical principals, without running a full simulation to determine movements of objects. Accordingly, some examples may determine a predicted driving scenario based at least in part on the intermediate value of the first parameter. A score may be determined based on proximity to the first event in the predicted driving scenario. Executing a run of a driving scenario may be considered an example of determining a predicted driving scenario. Predicting a driving scenario without executing a run of the driving simulation may be computationally more efficient than running a simulation for every attempted value of every changeable parameter. Alternatively or additionally, some examples may determine that an intermediate value yields an impossible or improbable result, such as causing a new overlap between stationary objects. In such a case, the intermediate value may be rejected without executing a driving simulation or without determining a predicted driving scenario.

In particular examples, a run of the driving simulation is executed based on a first modified parameter if one or more objects (or one or more specified objects) are to be converted to smart agents. A smart agent may be an object controlled in a driving simulation using a planning component, similar (but optionally more functionally limited than) a planning component used to control an autonomous vehicle. Where no objects are converted to smart agents, or where one or more specified objects are not converted to smart agents, a simpler predicted driving scenario may be determined without executing a run of the driving simulation. In other examples a run of a driving simulation may still be executed even if no objects are converted to smart agents, or if only the autonomous vehicle is controlled in the simulation in accordance with a planning component. In some examples, the first parameter (or one of the parameters modified by the search algorithm 106) may be associated with conversion of an object to a smart agent. For example, the first parameter may indicate whether an object is to be converted to a smart agent, and/or at what time during a driving scenario/simulation run an object is to be converted to a smart agent.

The simulation score determined by scoring block 110 may be provided to a modified parameter determination block 112. However, in some examples the initial simulation score, corresponding to the initial intermediate value of the first parameter, may be passed directly to the parameter determination block 108 and not the modified parameter determination block. This may allow further iterations of the value of the first parameter to be attempted before outputting a final modified value.

Upon receiving the initial simulation score, the parameter determination block 108 may determine a further intermediate value of the first parameter. A further intermediate value may in some examples be based on the initial simulation score for the initial intermediate value. For example, if the initial simulation score indicates that an increase from the original value to the initial intermediate value of the first parameter improved the simulation score (e.g. reduced the simulation score, where a low score is optimum), the further intermediate value may be larger than the initial intermediate value.

Once determined, the further intermediate value may be input into the driving simulator 114 (or a simpler predicted driving scenario may be determined based, for example, on physical principles, as described above). The driving simulator 114 may execute a further run of the driving simulation based at least in part on the further intermediate value. Executing the further run may be substantially similar to executing the initial run, with the exception of the varied parameter(s) determined by the parameter determination block 108. The scoring block 110 may then determine a further simulation score based on the further run of the driving simulation. This further simulation score may be passed to the parameter determination block 108 to iteratively try additional intermediate values of the first parameter until the modified parameter determination block 112 determines that an optimum value of the first parameter has been found.

The modified parameter determination block 112 may receive determine if an intermediate value of the first parameter meets a threshold condition. For example, the threshold condition may be based at least in part on a score indicating proximity to the first event in the (real-world) first log data. The threshold condition may require that the score for an intermediate value is similar to that of the first log data, or indicates closer proximity to the first event than in the first log data. The threshold condition may comprise an upper bound and/or lower bound for the score. The upper and/or lower bound may be based on respective multiples of the score for the first log data, or specified differences away from the score for the first log data. Such examples may provide a modified value of the first parameter (and/or modified values of a set of parameters) which are associated with similar proximity to occurrence of the first event as represented in the first log data. Such examples may provide additional examples for training data that are similar (e.g. similarly rare/representing similarly dangerous scenarios) to the first log data. Alternatively or additionally, the modified parameter 112 may determine if an intermediate value represents an optimum value of the first parameter based on the simulation score associated with that value of the first parameter. The modified parameter determination block may compare a newly received simulation score to one or more simulation scores calculated for previous iterations of the intermediate value. The modified parameter determination block 112 may determine whether an output condition has been satisfied. For example, an output condition may be that a difference between a newly received simulation score and one or more previous simulation scores is below a predetermined threshold. This may indicate, for example, that the simulation score is approximately in a (local) maximum or minimum. An intermediate value of the first parameter corresponding to the best (highest/lowest) simulation score may then be output as the modified value of the first parameter. In other examples, the output condition may be based on a number of iterations of intermediate value attempted by the search algorithm. For example, once a predetermined number of iterations has been tried, the modified parameter determination block 112 may output the intermediate value of the first parameter corresponding to the best (highest/lowest) simulation score.

The modified value of the first parameter output by search algorithm 106 may then be stored in memory associated with the computing device(s) 100, represented in FIG. 1 by validation (or testing) data database 118. Modified log data may be generated and stored in said memory. Modified log data may comprise the modified value of the first parameter, and unmodified values of other parameters in the first log data 104. In effect, the modified log data may be considered an alternative version of the first log data 104.

The modified log data may be used to validate or test a machine learning algorithm, such as a machine learning algorithm for controlling an autonomous vehicle. For example, the modified log data may be used to validate or test a prediction and/or planning component of an autonomous vehicle. As used herein, validation data may refer to data used to evaluate a machine learning model before a final model is output, for example when hyperparameters (e.g. number of layers in a neural network) may still be varied. Test data may refer a data used to evaluate a final machine learning model. However, in some examples, a separate test processes may not be performed. In some examples the validation step may act as a final test of the model, for example if hyperparameters are fixed. In some examples, validating/testing the machine learning model may comprise executing a run of driving simulation comprising a simulation of an autonomous vehicle controlled, at least in part, based on the machine learned model. The machine learned model may receive simulated inputs corresponding to inputs the model would receive in a real-world runtime environment. The run of the driving simulation may be based on the modified log data. In other words, the model may be tested against a simulation of the modified driving scenario represented in the modified log data. A metric associated with performance of the machine learning model in the run of the driving simulation may be generated. The metric may be on a binary scale (e.g. pass fail), or may be based on any other scale, such as a percentage score.

To this end, the modified log data may be stored in validation (or test) data database 118, or otherwise marked as available for validation/testing. In some examples, the modified log data may then be used by a validation (and/or testing) component 120 to validate and/or test a machine learning algorithm. Validating and/or testing the machine learning model(s) based on the modified driving scenario represented in the modified log data may help verify that the machine leaning model(s) can operate safely in a range of scenarios, and in particular rare or potentially dangerous scenarios.

In some examples, the original first log data may be used to train the machine learning model. Accordingly, a training component 122 of the computing device(s) 100 may receive the first log data from the data log storage 122. The training component 122 may train the machine learning model. The machine learning model may then be tested or validated using modified versions of that log data.

FIG. 2 shows a flowchart of a method 200. Method 200 may be performed by a computing device(s), such as computing device(s) 100. Method 200 may be implemented as instructions stored in a computer readable medium which, when executed, cause one or more processors of a computer to perform the method 200. Method 200 may be implemented as instructions of a computer program which, when executed, cause one or more processors of a computer to perform the method 200.

Method 200 starts at step 202, at which log data may be received. Log data may be received from a memory storing log data, such as log data database 102 of computing device(s) 100. Log data may be received from a vehicle traversing an environment. The log data may describe a scene in a driving environment. The log data may represent the environment at a first time, or during a period of time. As discussed further below, the log data may requested, for example based on a driving sequence associated with the log data.

The log data may comprise a first value of a first parameter descriptive of the environment, or of an object in the environment. The first parameter may be associated with a first object in the environment. For example, the first parameter may be associated with a position of an object in the environment. FIG. 2 illustrates the example log data 104 discussed above in relation to FIG. 1, showing an example first value of $x_0$ for a first parameter x, in this example a position of pedestrian 156 at a starting time of the first log data.

At step 204, a first intermediate value of the first parameter may be determined. The first parameter may be a parameter determined by search algorithm 106 or otherwise by computing device(s) 100 to contribute to proximity to occurrence of the first event, as discussed further above. In some examples, the first intermediate values may be the initial intermediate parameter, as discussed above in relation to FIG. 1. In other examples, there may have been earlier intermediate values tested in accordance with the method 200 before arriving at the first intermediate value. In such cases the first intermediate value may be determined based on simulation score(s) associated with one or more of the earlier intermediate values. The first intermediate value may be determined on a first parameter range, for example to limit the first intermediate value to values of the first parameter that are likely to occur in the real world.

At step 206, a first run of a driving simulation may be executed. The first run of the driving simulation is based at least in part on the first intermediate value of the first parameter. Thus, in the example first run 116 illustrated in FIG. 2, the starting position of the simulation of pedestrian 156 may be moved from $x_0$ to $x_1$. Other parameters of the log data 104 may be replicated in the first run 116 of the driving simulation to generate a simulated environment that approximates the real-world environment represented in the log data 104. Alternative examples may determine a first predicted driving scenario, as described below in relation to step 706 of method 700.

At step 208, a first simulation score may be calculated. The first simulation score may be associated with the first run 116 of the driving simulation. The first simulation score may descriptive of proximity to occurrence of the first event in the first run of the driving simulation. The first event may be an adverse event between two or more objects in the simulated environment. For example, the first simulation score may be associated with a proximal-encroachment time between a first simulated object and a second simulated object in the first run 116 of the driving simulation. In the illustrated example, the first simulation score may be, or may be associated with, the proximal-encroachment time $\Delta t_1$ between the simulations of the first vehicle 152 and the pedestrian 156 in the first run 116 of the driving simulation. Alternative examples may calculate a first score as described below in relation to step 708 of method 700.

At step 210, a second intermediate value of the first parameter may be determined. The second intermediate value of the first parameter may in some examples be determined based on the first simulation score associated with the first intermediate value. For example, if the first intermediate value was an increased value compared to a previous intermediate value, and the corresponding first simulation score represented an improvement (either increase or decrease in simulation score, depending on the direction of optimum value for the particular simulation score), the second intermediate value may be chosen to further increase the value of the first parameter. Where the simulation score is associated with a proximal-encroachment time, a reduction in simulation score may represent an improvement in the score (i.e. 0 is the 'optimum' possible score, representing an adverse event in the simulated environment).

At step 212, a second run of the driving simulation may be executed. The second run of the driving simulation may be based at least in part on the second intermediate value of the first parameter. Executing the second run of the driving simulation may be substantially similar to executing the first run, expect for the different value of the first parameter (and any other parameters being modified). For example, FIG. 2 illustrates the simulations of the first vehicle 152 and the pedestrian 156 in a second run 122 of the driving simulation. The second intermediate value of the first parameter, here the starting position of the pedestrian 156, is $x_2$. In the illustrated example, $x_2$ represents a starting position closer to the first vehicle 152 than the first intermediate value, $x_1$.

At step 214, a second simulation score may be calculated. The second simulation score may be associated with the second run 122 of the driving simulation. The second simulation score may be calculated in substantially the same way as the first simulation score, but for the second run 122 rather than first run 116 of the driving simulation. For example, the second simulation score may be associated with a proximal-encroachment time between a first simulated object and second simulated object in the second run 122. In the illustrated example, the second simulation score may be associated with a proximal-encroachment time between the first vehicle 152 and pedestrian 156. In the second run 122, the proximal-encroachments time, $\Delta t_2$ between the first vehicle 152 and the pedestrian 156 is smaller than the proximal-encroachment time $\Delta t_1$ in the first run 116. This is because simulated pedestrian 156 starts the simulated driving scenario closer to the first vehicle 152. When the simulated pedestrian 156 is controlled to cross the road 154 in accordance with the behavior of the real pedestrian 156 in the log data 104, the simulated pedestrian 156 and simulated first vehicle 152 are much closer to an adverse event than in the first run 116 or in the real-world data. In such examples, it may be desired to find a value of the first parameter that causes, or almost causes, an adverse event. Thus the second simulation score associated with the proximal-encroachment time $\Delta t_2$ may be considered an improved simulation score relative to the first simulation score.

At step 216, a modified value of the first parameter may be determined. In some examples, the second intermediate value of the first parameter may be identified as the modified value of the first parameter. For example, the second intermediate value may be associated with the best (e.g. lowest) simulation score of attempted intermediate values. The modified value may be determined based on a plurality of intermediate values, for example taking an average between values.

In some examples, the modified value determined in step 216 may be output and may, for example be stored for later use. In some examples, modified log data may be generated. Modified log data may comprise values of additional parameters from the log data 104, and the modified value of the first parameter (and any other modified values of other parameters determined similarly to the modified value of the first parameter). In other words, the modified log data may substantially correspond to the real-world log data, except for a small number of modified values. Thus the modified log data may represent a driving scenario that is a close approximation of the real world, maintaining realism of the real world, but slightly modified to generate a modified driving scenario associated with the first event. The modified driving scenario may represent a driving scenario that is useful for validating or testing a machine learning model for controlling an autonomous vehicle. For example, the modified driving scenario may represent a driving scenario that is rare in the real-world data, and/or is particularly important for verifying that the machine learning model can perform safely when faced with scenarios such as those representing a safety critical event, e.g. an adverse event.

In the illustrated example method 200, at step 218 a machine learning model may be validated or tested based on the modified value of the first parameter and/or based on the modified log data. For example, the modified log data may be provided as validation and/or test data for the machine learning model. The machine learning model may comprise a neural network comprising an input layer, output layer, and one or more hidden layers. Validating and/or testing the machine learning model may comprise any technique for validating/testing machine learning models, as will be appreciated by the person skilled in the art. As discussed above, the machine learning model may have been trained based at least in part on the first log data.

Figure 3:
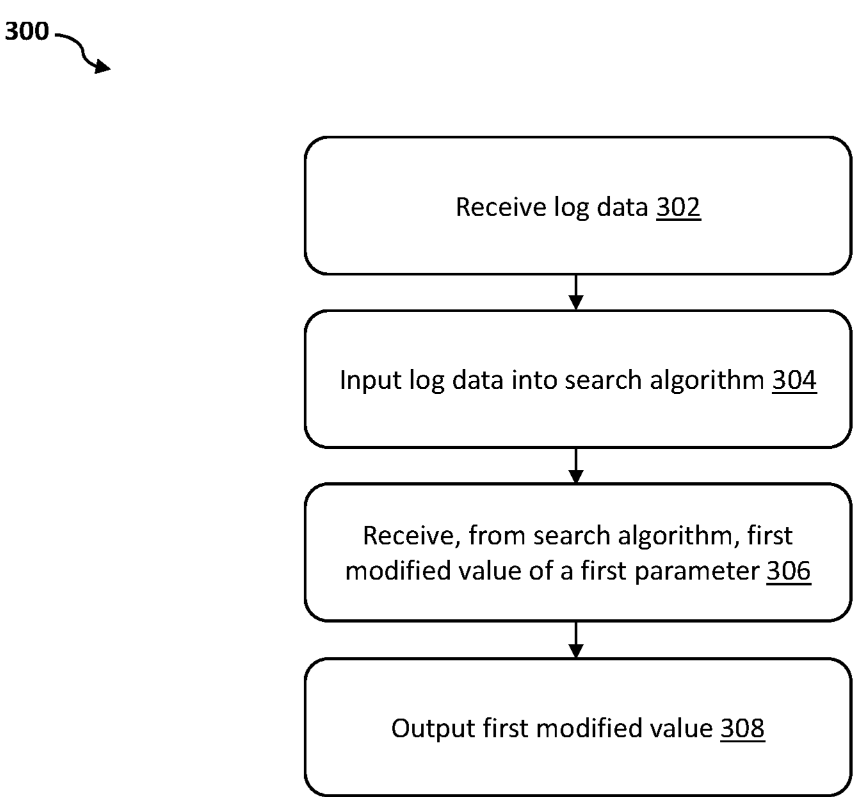
FIG. 3 depicts a flow chart of a process for outputting a modified value of a parameter according to embodiments of the present invention.

FIG. 3 illustrates an example method 300 of the present application. The method 300 may be implemented by a computer device, such as computer device(s) 100. The method 300 may be stored as instructions on one or more non-transitory computer-readable media. The method 300 may be stored as instructions on one or more transitory computer-readable media. The method 300 may be implemented as instructions of a computer program which, when executed by a computer device, cause the computer device to perform the method 300.

Method 300 starts at step 302, at which log data may be received. Step 302 may be substantially similar to step 202 of method 200 described above. In some examples, method 300 may comprise initially requesting the log data based on a driving sequence associated with the log data. Log data may then be received in step 302 in response to the request. For example, a request for log data may be sent to a data log database, such as data log database 102. A data log in the data log database may be associated with one or more labels. The labels may be automatically or manually applied. The labels may be descriptive of a driving scenario represented in that log data. For example, the one or more labels may represent keywords describing features of the log data. The request for log data may specify a first label. In response, a data log may be received in step 302 which is associated with the first label. The data log database, or a search algorithm associated with the data log database, may perform a search of the data logs stored in the data log database to identify one or more data logs associated with the first label, and may provide one or more of said data logs for processing in accordance with method 300. In this way, data logs comprising interesting driving scenarios may be retrieved. For example, a data log comprising a specified event may be retrieved. In some examples, the specified event may represent a switch from autonomous to manual control of an autonomous vehicle, for example take over by a safety driver. Such a switch to manual control may indicate that the driving scenario represented a challenging scenario that the machine learning model(s) controlling the autonomous vehicle require further training on. In other examples, a driving log may be requested based on a type of interaction between a first object and a second object in the environment represented by the log data. For example, a driving log may be requested based on an object being positioned within a threshold distance of the autonomous vehicle (or any other object). For example, this may represent 'near miss' situations between the autonomous vehicle and an object. A driving log may be requested based on a classification of interacting objects. For example, the driving log may be requested that represents an interaction between cyclist and a vehicle. A driving log may be requested based on map or environmental conditions represented in the log data, such as a road junction type or a weather condition.

At step 304, the received log data may be input into a search algorithm. The search algorithm may be a directed search algorithm. The search algorithm may perform a Bayesian optimization. The search algorithm may determine intermediate values of a first parameter of the log data. An intermediate value, or each intermediate value, may be tested by executing a driving simulation based at least in part on the that intermediate value, as discussed above in relation to driving simulator 114 and steps 206 and 212 of method 200. In some examples, an intermediate value may be tested by determining a predicted driving scenario without executing a simulation, as discussed above in relation to step 706 of method 700. The search algorithm may determine a score associated with an intermediate value based on the respective run of the driving simulation/predicted driving scenario. The score may be associated with proximity to occurrence of a first event in the respective run of the driving simulation/predicted driving scenario. For example, the first event may be an adverse event. The score may represent how close a first object and a second object in the respective run of the driving simulation/predicted driving scenario came to overlapping. For example, the score may be, or may be associated with, a proximal-encroachment time between a first object and a second object in the simulated/predicted environment.

At step 306, a first modified value of the first parameter may be received from the search algorithm. The first modified value may represent an optimized value of the first parameter associated with an optimum simulation score. For example, where the first event is an adverse event, the first modified value may be associated with the run of the driving simulation in which the two objects came closest to overlapping in space and time, or did overlap. In other examples, the first modified value may represent a value associated with a score similar to a score representing proximity to the first event in the first log data, as discussed further above.

At step 308, the first modified value may be output. The first modified value may be stored for later use. In some examples first modified log data may be generated based at least in part on the first modified value. First modified log data may comprise the first modified value of the first parameter. First modified log data may also comprise unmodified values of additional parameters in the log data. Thus first modified log data may represent a modified version of the original, real-world log data.

The first modified value may be identified for use in validating or testing a machine learning model or models for controlling an autonomous vehicle. The first modified value may be used to validate or test such a machine learning model. In some examples, the first modified value may be used to generate a metric descriptive of the first log data. Such a metric may be associated with a difference between the first modified value and the original value of the first parameter in the first log data. Such a metric may be representative of the proximity of the driving scenario in the first log data to the first event. For example, such a metric may be descriptive of how dangerous the driving scenario in the first log data may be. In some examples, a metric descriptive of the machine learned model may be generated based at least in part on the first modified value. Such a metric may be generated based on validation and/or testing of the machine learned model. For example, such a metric may be associated with performance of the machine learned model when tested in a driving scenario based, at least in part, on the first modified value (and/or on the first modified log data). The driving scenario may be a simulated driving scenario simulated in a run of a driving simulation, the driving simulation comprising a simulated autonomous vehicle controlled, at least in part, based on the machine learned model.

The methods 200 and 300 described above have primarily described determining a single modified value of a single parameter of the log data. In other examples, multiple modified values may be determined for the first parameter. For example, the search algorithm may determine multiple local maxima/minima in the simulation score, and output modified values associated with two or more of said maxima/minima. Additionally or alternatively, some examples may determine a modified value of a second parameter in the log data. A modified value of the second parameter may be determined following substantially the method used to determine a modified value of the first parameter, for example using a directed search algorithm. In some examples, the search algorithm concurrently modifies the first parameter and second parameter. In such cases, a set of modified values of the first parameter and second parameter may be received from the search algorithm, associated with occurrence of the first event. For example, occurrence of the first event may depend on both the first parameter and the second parameter. The closest occurrence to the first event may occur when both parameters are modified. There may be a range of pairs of values of the first parameter and second parameter that cause, or come close to causing, the first event. Further parameters may also be modified, in a similar way. For example, the search algorithm may search one or more, two or more, three or more, four or more, five or more, ten or more, fifteen or more, or twenty or more parameters in the first log data. The search algorithm may determine which of said parameters to modify, based on occurrence of the first event in respective simulation runs. For example, the search algorithm may output a modified value of only one parameter, despite searching a plurality of parameters. The search algorithm may output respective modified values of only sub-set of a plurality of parameters that are searched.

In some examples, method 300 may further comprise determining one or more parameters to search. For example, method 300 may determine a parameter to search based on an interaction between a first object and a second object represented in the first log data, such as an interaction between the autonomous vehicle traversing the environment and another object. For example, method 300 may comprise determining one or more parameters to search that are associated with an interaction between the autonomous vehicle and another object. An interaction may for example comprise overlapping trajectories, or the other object coming within a predetermined distance of the autonomous vehicle. Such approaches may reduce the number of parameters searched by identifying parameters associated with important interactions represented in the log data. Other parameters in the log data may then not be searched by the search algorithm. This may improve the efficiency of the search process.

Figure 4:
FIG. 4 depicts a flow chart of a process for validating a machine learned model according to embodiments of the present invention.
Figure 4:
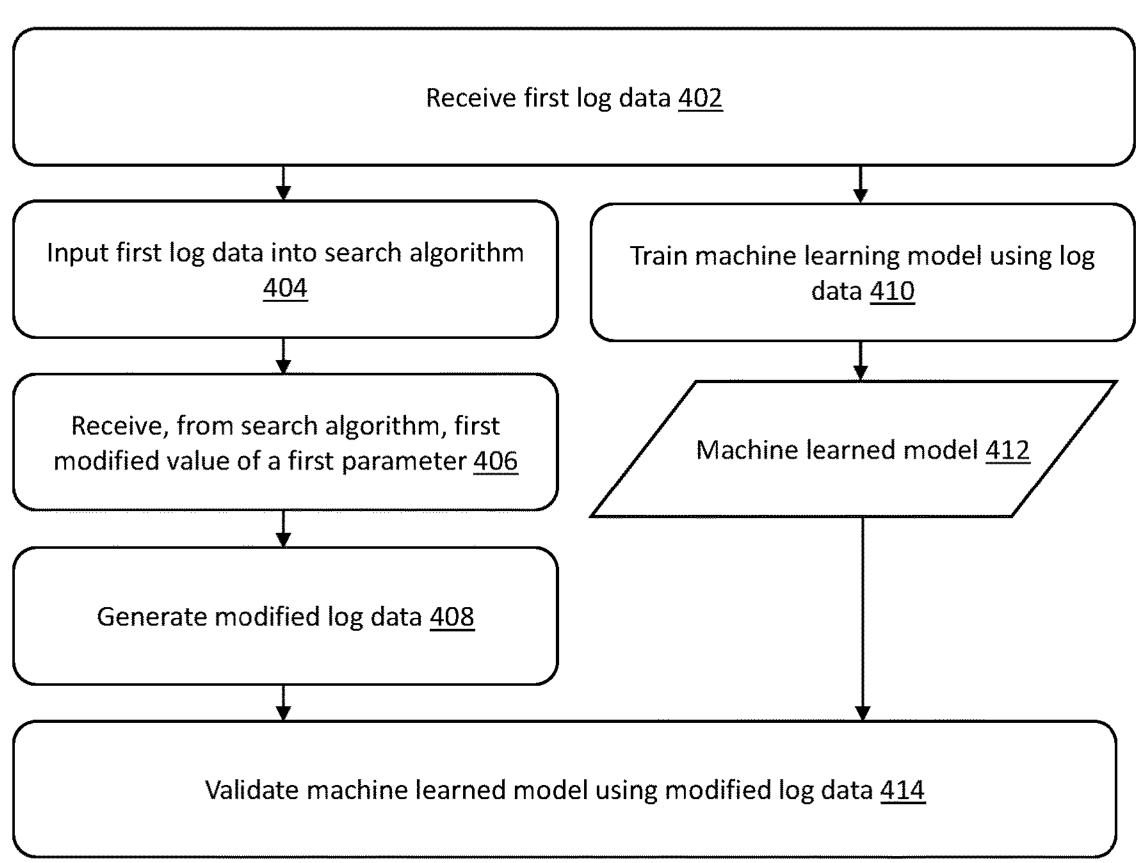

FIG. 4 illustrates an example method 400 according to the present application. The method 400 may be implemented by a computer device, such as computer device(s) 100. The method 400 may be stored as instructions on one or more non-transitory computer-readable media. The method 400 may be stored as instructions on one or more transitory computer-readable media. The method 400 may be implemented as instructions of a computer program which, when executed by a computer device, cause the computer device to perform the method 400.

Method 400 starts at step 402, at which first log data is received. Step 402 may be the same, or substantially the same, as step 302 of method 300.

From step 402, method 400 follows two separate paths. A first path comprises steps 404-408. At step 404, the first log data may be input into a search algorithm. At step 406, a first modified value of a first parameter may be received from the search algorithm. At step 408, modified log data may be generated. Steps 404-408 may be the same, or substantially the same as the corresponding steps 304-308 of method 300, discussed above.

Returning to step 402, the method 400 also follows the second path, comprising step 410. At step 410, a machine learning model is trained using the first log data. The machine learning model may be a model for controlling an autonomous vehicle. For example, the model may control a prediction and/or planner component of an autonomous vehicle. The machine learning model may comprise an artificial neural network. After training, a trained machine learned model 412 is output.

The two paths of method 400 combine in step 416. At step 416, the trained machine learned model 412 is validated or tested based at least in part on the modified log data generated in step 408. Validation or training may comprise the techniques discussed above in relation to FIGS. 1-3.

Thus, the method 400 trains a machine learning model on a real-world driving scenario, and validates/tests the resulting machine learned model 412 using a modified version of that driving scenario, as represented in the modified log data. This may be used to verify that the model 412 can operate with variations of the first log data, and so has not been overfit to the specific parameters of the first log data. In some examples, a plurality of modified values may be determined from the first log data, for example for different parameters of the first log data. The model 412 may be validated/tested against each generated modified value. For example, respective runs of a driving simulation may be executed based on each modified value (or respective modified log data generated therefrom). A score may be determined for each run, for example representing a pass or fail depending on successful navigation of the simulated driving scenario. A combined metric may then be generated, representing performance of the model 412 against the plurality of modified values. For example, the combined metric may indicate that the model 412 successfully navigated 90% of simulated driving scenarios based on the modified values. Such a metric may provide a measurable verification that the model 412 is able to navigate situations similar to that represented in the first log data. The metric may for example be compared to a threshold or condition. If the metric does not satisfy condition, or is below the threshold, it may be determined that the model 412 requires further training. Such examples may be particularly beneficial when a real-world driving scenario has caused a failure in an existing machine learned model, for example causing the machine learned model to stop or requiring takeover of a vehicle by a safety driver. The model may be modified or otherwise further trained based on problematic driving scenario. The method 400 may be used to verify that the model has been improved, and can successfully handle a range of similar driving scenarios, rather than being overfit to the specifics of the real-world driving scenario. This may be particularly useful for rare scenarios, which do not occur frequently in available training/validation/testing data.

Figure 5:
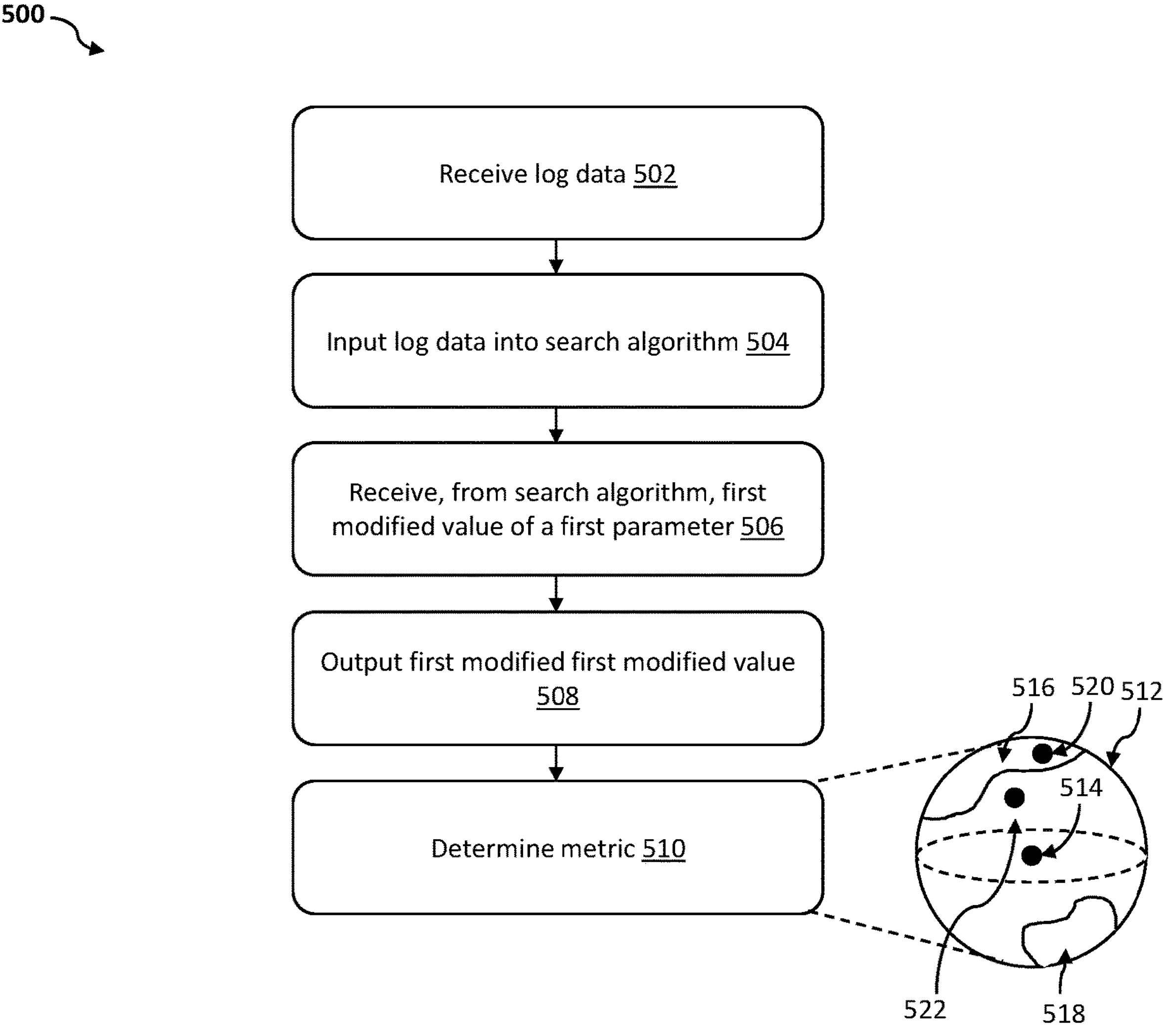
FIG. 5 depicts a flow chart of a process for determining a metric according to embodiments of the present invention.

FIG. 5 illustrates an example method 500 according to the present application. The method 400 may be implemented by a computer device, such as computer device(s) 100. The method 500 may be stored as instructions on one or more non-transitory computer-readable media. The method 500 may be stored as instructions on one or more transitory computer-readable media. The method 500 may be implemented as instructions of a computer program which, when executed by a computer device, cause the computer device to perform the method 500.

Method 500 starts at step 502, at which log data is received. At step 504, the log data may be input into a search algorithm. At step 508, a first modified value of a first parameter may be received from the search algorithm. At step 510, the first modified value may be output. Steps 502-508 may be the same, or substantially the same as the corresponding steps 302-308 of method 300, discussed above.

At step 510, a metric is determined based at least in part on the first modified value of the first parameter. In some examples, the metric may be descriptive of a machine learned model validated/tested based on the first modified value, as described above. In other examples, the metric may be descriptive of the first log data. For example, the metric may represent a difference between the first modified value and the original value in the first log data. In other words, the metric may represent the proximity of the driving scenario in the first log data to the first event, such as an adverse event. For example, such a metric may be descriptive of how dangerous the driving scenario was.

In some examples, the search algorithm may concurrently vary multiple parameters to optimize for proximity to the first event. The search algorithm may output sets of modified values, each set of modified values comprising respective modified values of a plurality of parameters. Each set of modified values may represent a local minimum (or maximum) in the scoring function in the available parameter space. Each set of modified values may be considered to define a co-ordinate in a parameter space.

FIG. 5 illustrates an example parameter space 511. Each dimension in the parameter space 511 represents a respective parameter of the first log data. The value of a parameter represents a position in the respective dimension for that parameter. Although illustrated as a three-dimensional, parameter space 512 may have n-dimensions, where n is any integer. In some examples, n is equal to the number of parameters searched by the search algorithm.

Parameter space 512 may be centered around an origin 514. Origin 514 may represent the original values of the parameters in the first log data.

Each set of modified parameters generated by the search algorithm may be represented in the parameter space 512. Where the origin 514 represents the original values, the distance between the origin 514 and the position of a set of modified values in the parameter space 512 may represent the change in each respective parameter from the original value needed for occurrence, or near occurrence, of the first event.

In some examples, a surface or manifold may be defined in the parameter space 512. The perimeter of the surface may be defined based on sets of modified values as represented in the parameter space 512. The perimeter of the surface may therefore be considered a threshold between occurrence of the first event, and non-occurrence of the first event.

In FIG. 5 a first surface 516 and a second surface 518 defined in parameter space 512. Each surface 516, 518 may encompass a range of values of parameters associated with the first event. For example, a first position 520, representing a first set of modified values, may be encompassed by the first surface 516. As such, a driving scenario based on that first set of modified values may cause, or be likely to cause, the first event. A second position 522, representing a second set of modified values, may be outside of the area encompassed by the first surface 516. As such, a driving scenario based on that second set of modified values may not be associated with the first event. For example, position 520 may represent an adverse event, whereas position 522 may represent safe navigation of a scenario.

Thus the surfaces 516, 518 may be descriptive of proximity of the first log data to occurrence of the first event. A metric may determine descriptive of the first log data. For example, a metric may be determined based at least in part on an area of the surface(s). The metric may further account for probability/likelihood of a value of a parameter to occur in the real-world. For example, the metric may be determined based on multiplying values of parameters defining the surface(s) 516, 518 by respective probabilities of occurrence of each value, and integrating over the surface(s) 516, 518. In some examples the parameter space 512 itself may be scaled based on probability of occurrence of values of parameters. For example, each dimension in the parameter space 512 may be scaled according to the respective probabilities for that parameter. The resulting surface 516, 518 may then already incorporate the likelihood of occurrence of the values.

Figure 6:
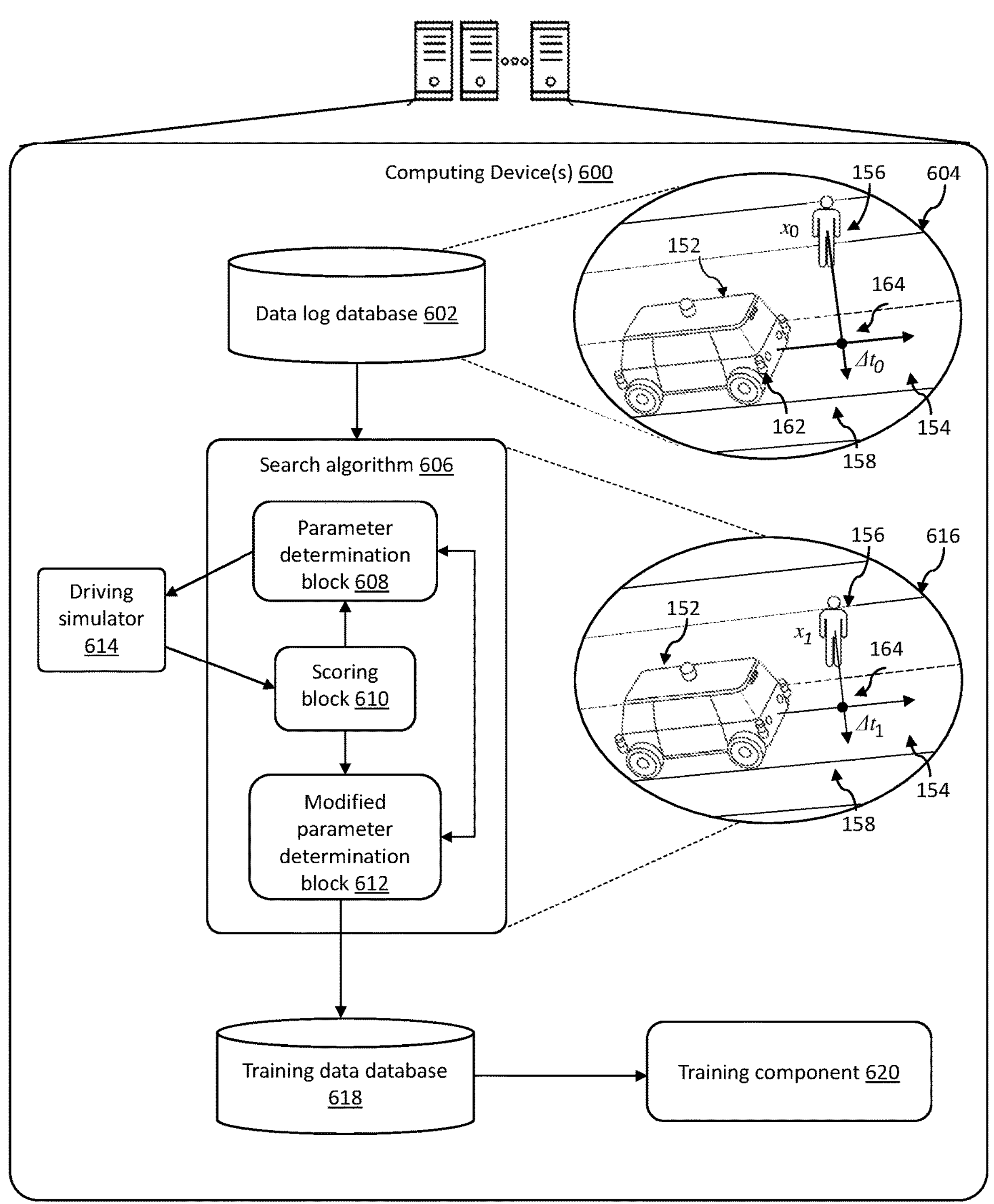
FIG. 6 is a pictorial diagram of a process for generating training data according to embodiments of the present invention.
Figure 7:
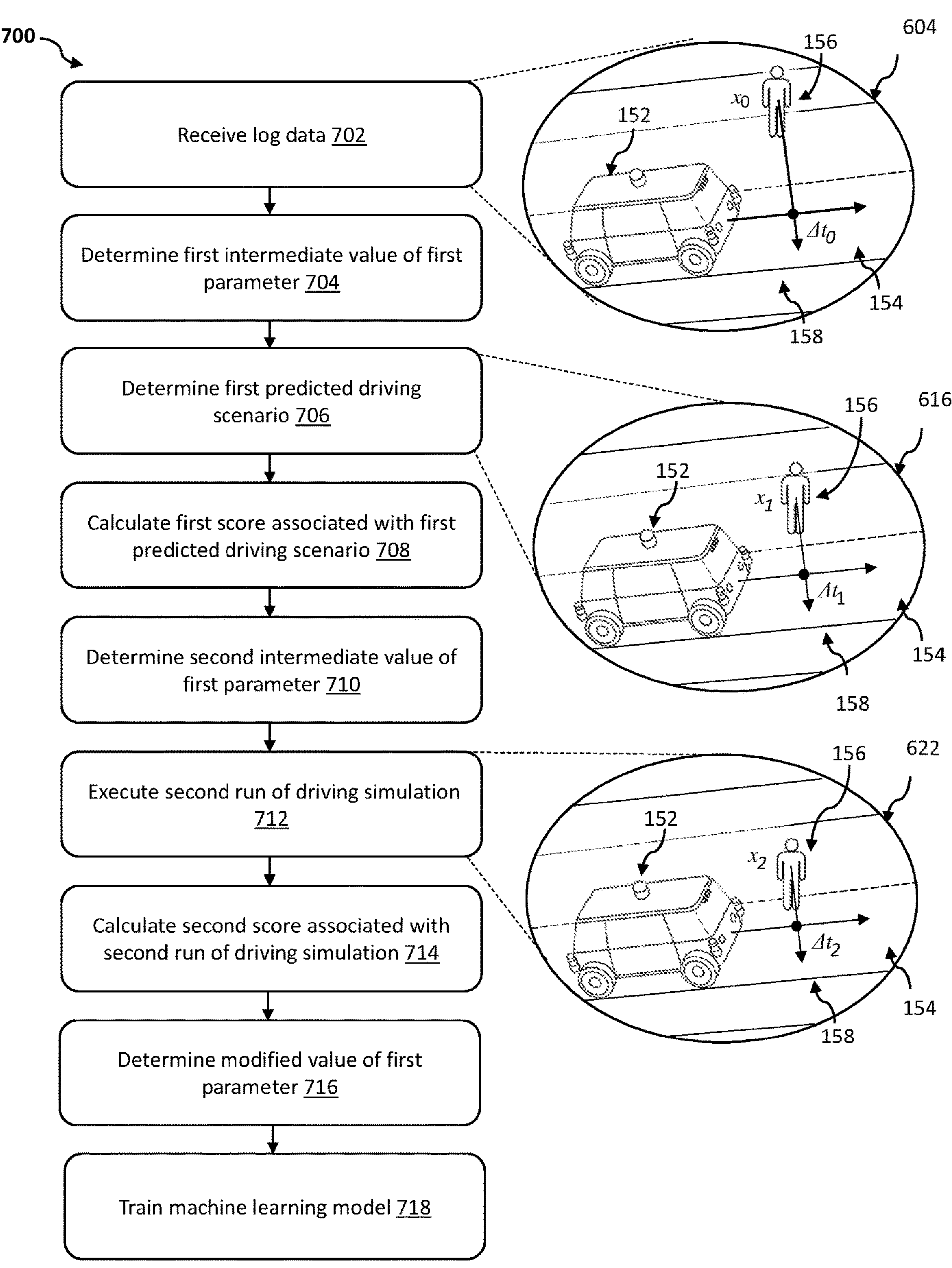
FIG. 7 depicts a flow chart of the process for generating training data according to embodiments of the present invention.

FIGS. 6 and 7 illustrate a further example of the invention. FIG. 6 illustrates an example a computing device 600, comprising the components and logical blocks discussed below. It is to be noted that although these components and blocks are shown as distinct elements, they may be implemented as operations performed by a processor of the computing device 600, and as memory elements of memory associated with the computing device 600. Computing device 600 may be the same as computing device 100.

Computing device 600 may comprise a data log database 602. Data log database may store instances of data logs. A driving scene represented in an example data log 604 is illustrated. The example driving scene is the same as that depicted in log data 104 shown in FIG. 1.

Computing device 600 may comprise a search algorithm 606. The search algorithm 606 may comprise a parameter determination block 608, a scoring block 610, and/or a modified parameter determination block 612. The search algorithm 606 may determine a first modified parameter of a first parameter in the log data 604, for example using a directed search approach or any other optimizer algorithm. The search algorithm may determine an intermediate value of the first parameter. A driving simulator 614 may execute a run of a driving simulation based on the intermediate value. The scoring block 610 may generate a simulation score for the run of the driving simulator descriptive of proximity to occurrence of a first event in the run of the driving simulation. An example initial run 616 of a driving simulation is illustrated in FIG. 6. The example modified driving scene illustrated in FIG. 6 is the same as that in the initial run 116 of FIG. 1, described above.

The components/logical blocks 602, 606, 608, 610, 612, and/or 614 may be the same, or substantially the same, as the corresponding components 102, 106, 108, 110, 112, and 114 of computing device 100 illustrated in FIG. 1. The components/logical blocks 602, 606, 608, 610, 612, and/or 614 may perform the operations described above in relation to their counterparts in FIG. 1.

The modified value of the first parameter output by search algorithm 606 may be stored in memory associated with the computing device(s) 600, represented in FIG. 6 by training data database 618. Modified log data may be generated and stored in said memory. Modified log data may comprise the modified value of the first parameter, and unmodified values of other parameters in the first log data 604. In effect, the modified log data may be considered an alternative version of the first log data 604.

The modified log data may be used to train a machine learning algorithm, such as a machine learning algorithm for controlling an autonomous vehicle. For example, the modified log data may be used to train a prediction and/or planning component of an autonomous vehicle. To this end, the modified log data may be stored in training data database 618, or otherwise marked as available for training. In some examples, the modified log data may then be used by a training component 620 to train a machine learning algorithm. Training the machine learning model(s) based on the modified driving scenario represented in the modified log data may help improve performance of the machine leaning model(s) when faced with similar scenarios. For example, this may improve the safety of an autonomous vehicle controlled by such machine learning models.

FIG. 7 shows a flowchart of a method 700. Method 700 may be performed by a computing device(s), such as computing device(s) 600. Method 700 may be implemented as instructions stored in a computer readable medium which, when executed, cause one or more processors of a computer to perform the method 700. Method 700 may be implemented as instructions of a computer program which, when executed, cause one or more processors of a computer to perform the method 700.

The log data may comprise a first value of a first parameter descriptive of the environment, or of an object in the environment. The first parameter may be associated with a first object in the environment. For example, the first parameter may be associated with a position of an object in the environment. FIG. 7 illustrates the example log data 104 discussed above in relation to FIG. 1, showing an example first value of $x_0$ for a first parameter x, in this example a position of pedestrian 156 at a starting time of the first log data.

At step 704, a first intermediate value of the first parameter may be determined. The first parameter may be a parameter determined by search algorithm 106 or otherwise by computing device(s) 100 to contribute to proximity to occurrence of the first event, as discussed further above. In some examples, the first intermediate values may be the initial intermediate parameter, as discussed above in relation to FIG. 1. In other examples, there may have been earlier intermediate values tested in accordance with the method 700 before arriving at the first intermediate value. In such cases the first intermediate value may be determined based on simulation score(s) associated with one or more of the earlier intermediate values. The first intermediate value may be determined on a first parameter range, for example to limit the first intermediate value to values of the first parameter that are likely to occur in the real world.

At step 706, a first predicted driving scenario may be determined. The first predicted driving scenario can be based at least in part on the first intermediate value of the first parameter. An example 116 illustrates the first predicted driving scenario. In this example, the starting position of the pedestrian 156 may be moved from $x_0$ to $x_1$. Other parameters of the log data 104, such as the starting position of the vehicle 152, may be replicated from the first log data, so that the predicted driving scenario approximates the real-world environment represented in the log data 104. In this example, it may be possible to predict the interaction between the vehicle 152 and pedestrian 156 based purely on physical principles. For example, given the speeds and starting positions of the vehicle 152 and pedestrian 156, it may be possible to determine the position of the pedestrian 156 at the time the vehicle 152 passes the pedestrian 156. The distance between the two objects may be sufficiently large to determine than an adverse event would not happen, and to assign a score to the predicted driving scenario based on that distance between the two objects. Accordingly, in this example a predicted driving scenario may be determined without executing a run of a driving simulation. In other examples, a simulation may be executed.

At step 708, a first score may be calculated. The first score may be associated with the first predicted driving scenario. The first simulation score may descriptive of proximity to occurrence of the first event in the first run of the driving simulation. The first event may be an adverse event between two or more objects in the predicted environment. For example, the first simulation score may be associated with a proximal-encroachment time between a first object and a second object in the first predicted driving scenario. In the illustrated example 116, the first score may be, or may be associated with, the proximal-encroachment time $\Delta t_1$ between the predicted positions of the first vehicle 152 and the pedestrian 156 in the first predicted driving scenario.

At step 710, a second intermediate value of the first parameter may be determined. The second intermediate value of the first parameter may in some examples be determined based on the first score associated with the first intermediate value. For example, if the first intermediate value was an increased value compared to a previous intermediate value, and the corresponding first score represented an improvement (either increase or decrease in simulation score, depending on the direction of optimum value for the particular score), the second intermediate value may be chosen to further increase the value of the first parameter. Where the score is associated with a proximal-encroachment time, a reduction in score may represent an improvement in the score (i.e. 0 is the 'optimum' possible score, representing an adverse event in the simulated/predicted environment).

At step 712, a run of the driving simulation may be executed. The run of the driving simulation may be based at least in part on the second intermediate value of the first parameter. For example, FIG. 7 illustrates simulations of the first vehicle 152 and the pedestrian 156 in a run 122 of the driving simulation. The second intermediate value of the first parameter, here the starting position of the pedestrian 156, is $x_2$. In the illustrated example, $x_2$ represents a starting position closer to the first vehicle 152 than the first intermediate value, $x_1$. The two objects now start much closer to each other. Accordingly, an adverse event may be much more likely. It may be expected that one or both of the objects would, in the real world, react to the proximity to the other object. Accordingly, determining a simple driving scenario based on simple physical equations may not yield an accurate representation of the real world. Thus it may be preferable to execute a run of a driving simulation based at least in part on the second intermediate value of the first parameter. For example a simulation may be executed if a simulation condition is met, such as two objects coming within a specified distance of each other. Executing a run of a driving simulation may provide a more complex prediction of how objects would react in the environment to the changed parameter. For example, one or more of the objects may be converted to smart agents. Thus one or more of the objects may be able to deviate from the behavior of the corresponding objects in the real-world data. In the illustrated example, one or both of the vehicle 152 and pedestrian 156 may be converted to smart agents. One or both of the objects 152, 156 may the be predicted to react to their proximity, for example by braking/stopping movement. This may make occurrence of a first event (e.g. an adverse event) less likely than would have appeared simply from predicting movement using physical principles without a simulation. In some examples, the first parameter (or another modifiable parameter) relates to whether to convert one or more objects to smart agents. Thus the search algorithm 106 may itself determine whether to execute a driving simulation or not.

At step 714, a second (simulation) score may be calculated. The second score may be associated with the run 122 of the driving simulation. The simulation score may be calculated in substantially the same way as the first score, but for the run of the driving simulation 122 rather than first predicted driving scenario 116. For example, the simulation score may be associated with a proximal-encroachment time between a first simulated object and second simulated object in the run 122. In the illustrated example, the simulation score may be associated with a proximal-encroachment time between the first vehicle 152 and pedestrian 156. In the run 122, the proximal-encroachments time, $\Delta t_2$ between the first vehicle 152 and the pedestrian 156 is smaller than the proximal-encroachment time $\Delta t_1$ in the first predicted driving scenario 116. This is because simulated pedestrian 156 starts the simulated driving scenario closer to the first vehicle 152. When the simulated pedestrian 156 is controlled to cross the road 154 in accordance with the behavior of the real pedestrian 156 in the log data 104, the simulated pedestrian 156 and simulated first vehicle 152 are much closer to an adverse event than in the first predicted driving scenario 116 or in the real-world data. In such examples, it may be desired to find a value of the first parameter that causes, or almost causes, an adverse event. Thus the second score associated with the proximal-encroachment time $\Delta t_2$ may be considered an improved score relative to the first score.

At step 716, a modified value of the first parameter may be determined. In some examples, the second intermediate value of the first parameter may be identified as the modified value of the first parameter. For example, the second intermediate value may be associated with the best (e.g. lowest) score of attempted intermediate values. The modified value may be determined based on a plurality of intermediate values, for example taking an average between values.

In some examples, the modified value determined in step 716 may be output and may, for example be stored for later use. In some examples, modified log data may be generated. Modified log data may be based at least in part on the modified value of the first parameter. Modified log data may comprise values of additional parameters from the log data 104, and the modified value of the first parameter (and any other modified values of other parameters determined similarly to the modified value of the first parameter). In other words, the modified log data may substantially correspond to the real-world log data, except for a small number of modified values. Thus the modified log data may represent a driving scenario that is a close approximation of the real world, maintaining realism of the real world, but slightly modified to generate a modified driving scenario associated with the first event. The modified driving scenario may represent a driving scenario that is useful for training a machine learning model for controlling an autonomous vehicle. For example, the modified driving scenario may represent a driving scenario that is rare in the real-world data, and/or is particularly important for training such as representing a safety critical event, e.g. an adverse event. Generating modified log data may comprise storing the modified value of the first parameter, and associating said modified value with the unmodified values of other parameters of the original first log data. In other words, it may not be necessary to store the unmodified values twice.

In the illustrated example method 700, at step 718 a machine learning model may be trained based on the modified value of the first parameter and/or based on the modified log data. For example, the modified log data may be provided as training data for the machine learning model. The machine learning model may comprise a neural network comprising an input layer, output layer, and one or more hidden layers. Training the machine learning model may comprise any technique for training machine learning models, as will be appreciated by the person skilled in the art.

Figure 8:
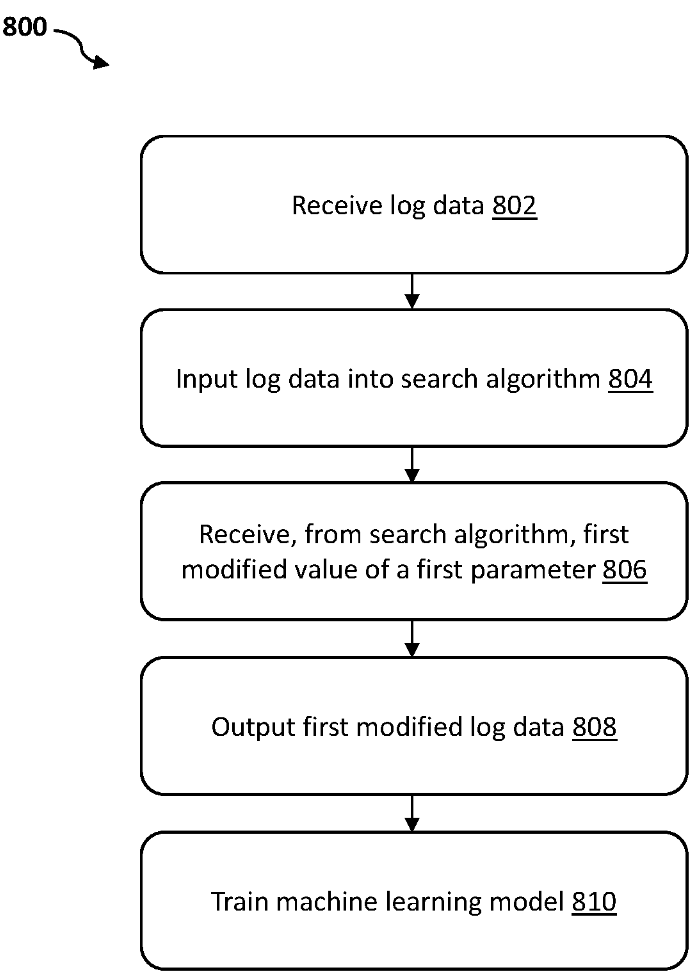
FIG. 8 depicts a flow chart of a process for outputting modified log data according to embodiments of the present invention.

FIG. 8 illustrates an example method 800 of the present application. The method 800 may be implemented by a computer device, such as computer device(s) 600. The method 800 may be stored as instructions on one or more non-transitory computer-readable media. The method 800 may be stored as instructions on one or more transitory computer-readable media. The method 800 may be implemented as instructions of a computer program which, when executed by a computer device, cause the computer device to perform the method 800.

Method 800 starts at step 802, at which log data may be received. At step 804, the received log data may be input into a search algorithm. At step 806, a first modified value of the first parameter may be received from the search algorithm. Steps 802, 804, and/or 806 may be the same or substantially the same as the corresponding steps 302-306 discussed above in relation to FIG. 3. Any of the examples and techniques discussed above in relation to steps 302-306 may be applied to the corresponding steps of FIG. 8.

At step 808, first modified log data may be output. First modified log data may be based at least in part on, or may comprise, the first modified value of the first parameter. First modified log data may also comprise unmodified values of additional parameters in the log data. Thus first modified log data may represent a modified version of the original, real-world log data. The first modified log data may be stored for later use. The first modified log data may be identified as training data for training a machine learning model or models for controlling an autonomous vehicle. In the illustrated example, method 800 may proceed to step 810, at which the first modified log data may be used to train such a machine learning model.

Figure 9:
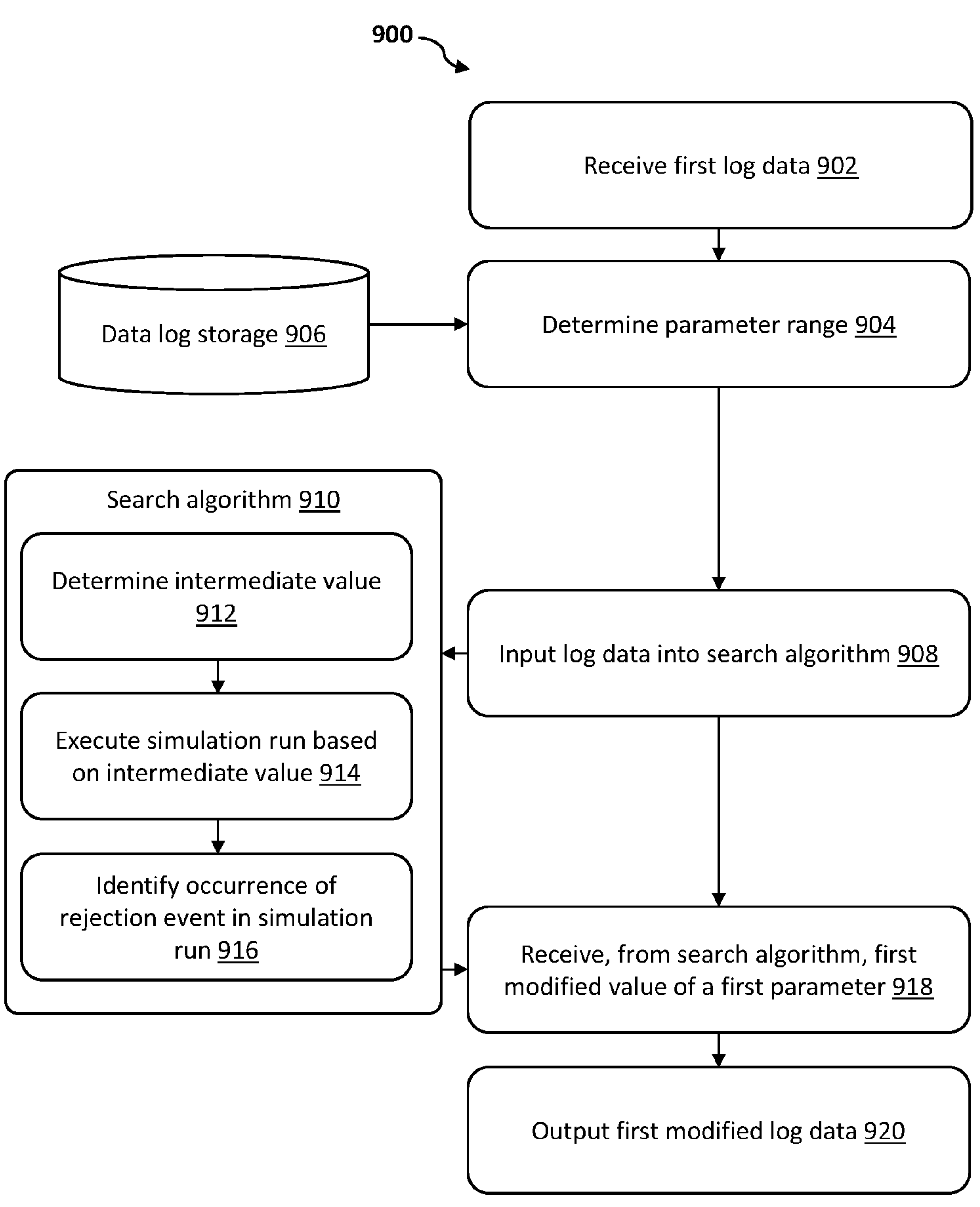
FIG. 9 depicts a flow chart of a process for outputting a modified value of a parameter or modified log data according to embodiments of the present invention.

FIG. 9 illustrates an example method 900 according to the present application. Compared to methods 300 and 800, method 900 comprises additional steps 904 and 912-916 which may be used to improve the realism of the resulting modified log data. Either or both of steps 904 and 912-916 may be used in any of the methods described above. For example, either or both of steps 904 and 912-916 may be used in methods that involve training a machine learning model (e.g. methods 700, 800), and/or in methods that involve validating/testing a machine learned model or determining a metric (e.g. methods 200, 300, 400, 500).

The method 900 may be implemented by a computer device, such as computer device(s) 100. The method 900 may be stored as instructions on one or more non-transitory computer-readable media. The method 900 may be stored as instructions on one or more transitory computer-readable media. The method 900 may be implemented as instructions of a computer program which, when executed by a computer device, cause the computer device to perform the method 400.

Method 900 starts at step 902, at which first log data is received. Step 902 may be the same or substantially the same as step 302 of method 300 and step 802 of method 800. The first log data comprises a value of a first parameter.

At step 904, a first parameter range may be determined. The first parameter range may represent a range of values of a first parameter may occur in a real-world scenario. Determining the first parameter range may comprise determining values of the first parameter in additional data logs. The additional data logs represent additional real-world data. Thus the first parameter range may be based at in part on an estimated likelihood of values of the first parameter occurring in the real-world environment. For example, values of the first parameter may be determined for additional data logs stored in a data log storage 906. The additional logs may be identified based on one or more properties of the environment associated with the first log data. For example, the additional log data may be associated with a same geographical location or region as the first log data. The additional log data may be associated with an object type of an object in the first log data. For example, the additional log data may be associated with a same type of vehicle as is represented in the first log data. The additional log data may be identified based on any map data or environmental attribute associated with the first log. As discussed above in relation to step 302, identifying additional log data may comprise searching for a log data associated with a first label, the first label associated with the first log data.

The first parameter range may be determined based on an analysis of the first parameter associated with the additional log data. For example, a distribution of values of the first parameter in the additional log data may be determined. The distribution may be, or may approximate, a Gaussian distribution. The first parameter range may be determined based on statistical attributes of said distribution, such as the mean value and standard deviation of the distribution. In some examples, statistical properties of the distribution may have already been calculated and stored. In such cases, determining the first parameter range may comprise retrieving the stored properties of the distribution of the first parameter in the additional log data.

The first parameter range may be identified based on any map data or environmental attribute associated with the first log data. For example the first parameter range may be determined based on a known speed limit of a road represented in the first log data.

Additionally or alternatively, some examples may comprise determining a first parameter range based on identifying occurrence of a rejection event. A rejection event may represent an impossible or improbable occurrence caused by the modification of the first parameter. For example, the rejection event may represent a new physical overlap between two objects in the simulated environment. For example, this may represent moving one stationary object into the same position as another stationary object, which would not be possible in the real-world. If such an event is identified, the intermediate value determined at step 912 is rejected. The rejection event may comprise determining that an object is operating beyond realistic values, for example based on an object type of the object. For example, a rejection event may be associated with an object having a speed or acceleration beyond what is likely in the real world. The rejection event may be based on an interaction between an object and map data. For example, particular regions of the map data may be considered out of bounds for objects of an object type, at least at an initial starting time. For example, an initial position of a vehicle may be constrained to being on a road, rather than on a sidewalk. One or more predetermined rules may be provided, for example rules specific to a type of object (e.g. based on real world observations). Rules may set ranges of possible parameter values for that object type. Identifying the rejection event may comprise comparing a potential modified value to the provided rules, or comparing values of other parameters that would be modified in consequence to the modified value of the first parameter to the provided rules (e.g. if map data is changed, a position of a vehicle relative to the road may change). A potential modified value associated with the rejection event may be excluded from the first parameter range.

In some examples, the first parameter range may be pre-determined, or provided by a human operator. In such examples, step 904 may comprise retrieving the pre-determined or specified first parameter range.

At step 908, the first log data is input into a search algorithm 910. The search algorithm may perform a process substantially the same as that described above in relation to search algorithm 106, method steps 204-216 of method 200, method steps 304-306 of method 300, search algorithm 606, and the corresponding steps of methods 600-800 described above. However, in this case the first parameter range may be provided as a constraint to the search algorithm. The first parameter range may limit the values an initial intermediate value of the first parameter can take. The first parameter range may limit the values any intermediate value can take, and may therefore constrain the value of the final modified value of the first parameter determined by the search algorithm 910 to being within the first parameter range.

Additionally or alternatively, the search algorithm 910 may take steps to reject an intermediate value of the first parameter if a rejection event results from an intermediate value of the first parameter. An intermediate value determined by the search algorithm 910 may be analyzed for occurrence of a rejection event prior to executing a driving simulation, or prior to determining a predicted driving scenario. Identify a rejection event may by the search algorithm 910 may be similar to the method of identify a rejection event for the first parameter range discussed above. In some examples, the search algorithm may identify occurrence of a rejection event in a run of the driving simulation. Thus in some examples, search algorithm 910 may perform optional steps 912-916. At step 912, an intermediate value of the first parameter is determined. At optional step 914, a run of the driving simulation may be executed based at least in part on the intermediate value. These steps may comprise the same operations as described above in relation to FIGS. 1-8. At step 916, occurrence of the rejection event is identified in the simulation run, or based on the intermediate value without executing a run of the driving scenario. The search algorithm 910 may then determine and test additional intermediate values, as discussed above. In some examples, the search algorithm 910 may check for occurrence of the rejection event in all executed simulation runs. In other examples, the search algorithm 910 may check for occurrence of the rejection event in only one, or a sub-set of executed simulation runs. For example, search algorithm 910 may check for the rejection event only where an intermediate value has been identified as an optimum value based on the simulation score. Checking for the rejection event may then be a final check before determining that intermediate value as the modified value.

At step 918, a first modified value of the first parameter is determined. At step 920, first modified log data is output. These steps may be the same, or substantially the same, as steps 306 and 308 of method 300 described above. In other examples, the first modified value of the first parameter may be output. Such examples may comprise the step 708 of method 700 described below.

Figure 10:
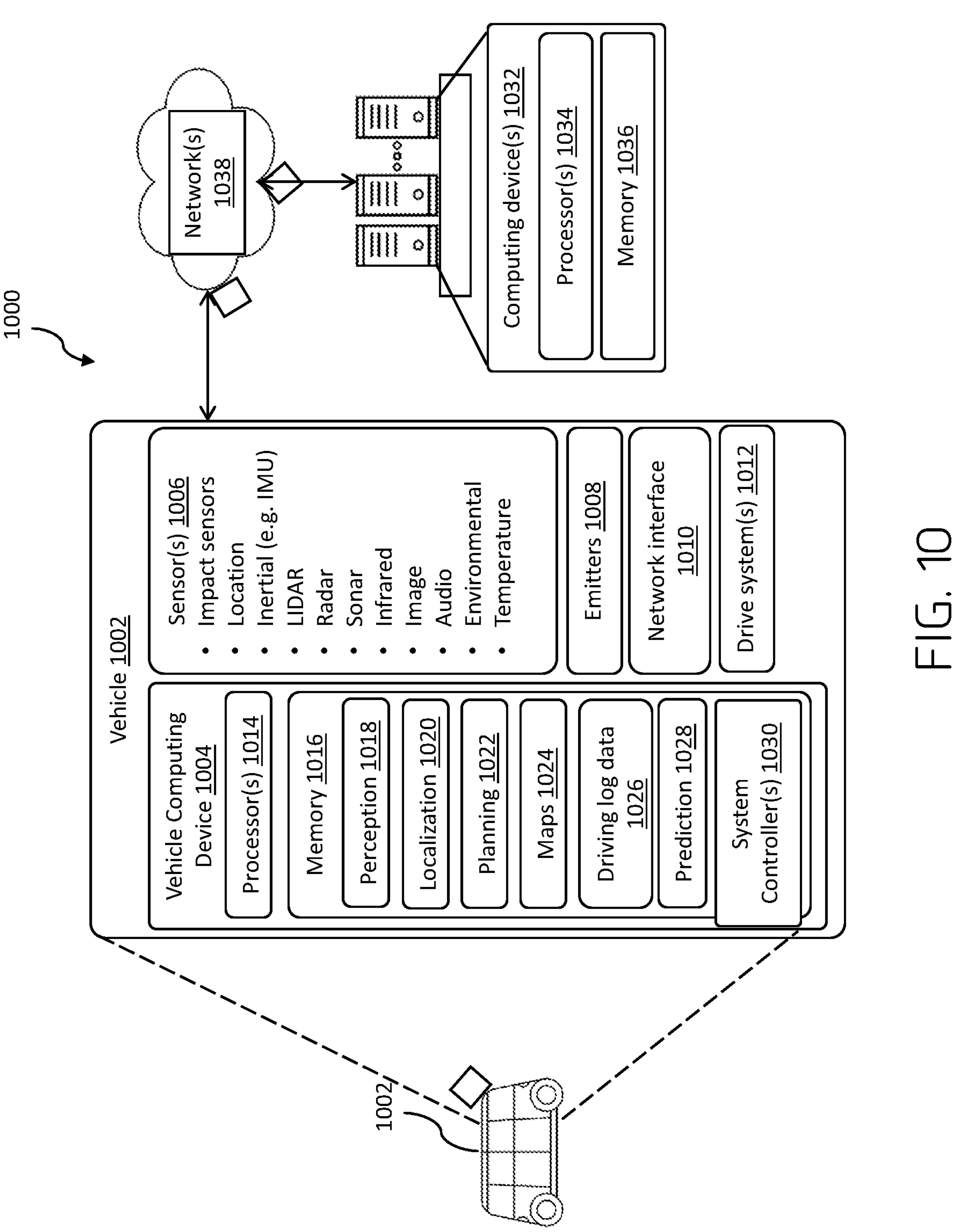
FIG. 10 is a block diagram of an example system for implementing the techniques described herein.

FIG. 10 illustrates a block diagram of an example system 1000 that may implement the techniques discussed herein. FIG. 10 may represent vehicle 152 and computing device(s) 100, 600 discussed above. FIG. 10 may represent a system used to collect and store log data. FIG. 10 may represent a system used to generate training, validation, and/or test data, and/or metrics, using the techniques described above. In some instances, the example system 1000 may include a vehicle 1002, which may represent the vehicle 152 in FIG. 1. The vehicle may be a vehicle controlled, at least in part, based on the machine learned model trained/validated/tested based on the techniques described above. The driving simulations described above may simulate operation of the vehicle 1002 in a simulated environment. In some instances, the vehicle 1002 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 1002 may be a fully or partially autonomous vehicle having any other level or classification. Moreover, in some instances, the techniques described herein may be usable by non-autonomous vehicles as well.

The vehicle 1002 may include a vehicle computing device(s) 1004, sensor(s) 1006, emitter(s) 1008, network interface(s) 1010, and/or drive system(s) 1012. Sensor(s) 1006 may represent sensor(s) 112. The system 1000 may additionally or alternatively comprise computing device(s) 1032. In some examples, computing device 1032 may represent computing device(s) 100, 500. Computing device 1032 may be configured to perform any of the methods or techniques described above in relation.

In some instances, the sensor(s) 1006 may represent sensor(s) 112 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 1006 may include multiple instances of each of these or other types of sensors. For instance, the radar sensors may include individual radar sensors located at the corners, front, back, sides, and/or top of the vehicle 1002. As another example, the cameras may include multiple cameras disposed at various locations about the exterior and/or interior of the vehicle 1002. The sensor(s) 1006 may provide input to the vehicle computing device(s) 1004 and/or to computing device(s) 1032.

The vehicle 1002 may also include emitter(s) 1008 for emitting light and/or sound, as described above. The emitter(s) 1008 may include interior audio and visual emitter(s) to communicate with passengers of the vehicle 1002. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 1008 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 1002 may also include network interface(s) 1010 that enable communication between the vehicle 1002 and one or more other local or remote computing device(s). The network interface(s) 1010 may facilitate communication with other local computing device(s) on the vehicle 1002 and/or the drive component(s) 1012. The network interface(s) 1010 may additionally or alternatively allow the vehicle to communicate with other nearby computing device (s) (e.g., other nearby vehicles, traffic signals, etc.). The network interface(s) 1010 may additionally or alternatively enable the vehicle 1002 to communicate with computing device(s) 1032 over a network 1038. In some examples, computing device(s) 1032 may comprise one or more nodes of a distributed computing system (e.g., a cloud computing architecture).

The vehicle 1002 may include one or more drive components 1012. In some instances, the vehicle 1002 may have a single drive component 1012. In some instances, the drive component(s) 1012 may include one or more sensors to detect conditions of the drive component(s) 1012 and/or the surroundings of the vehicle 1002. By way of example and not limitation, the sensor(s) of the drive component(s) 1012 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 1012. In some cases, the sensor(s) on the drive component(s) 1012 may overlap or supplement corresponding systems of the vehicle 1002 (e.g., sensor(s) 1006).

The drive component(s) 1012 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 1012 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 1012. Furthermore, the drive component(s) 1012 may also include one or more communication connection(s) that enable communication by the respective drive component with one or more other local or remote computing device(s).

The vehicle computing device(s) 1004 may include processor(s) 1014 and memory 1016 communicatively coupled with the one or more processors 1014. Computing device(s) 1032 may also include processor(s) 1034, and/or memory 1036. The processor(s) 1014 and/or 1034 may be any suitable processor capable of executing instructions to process data and perform operations as described herein. By way of example and not limitation, the processor(s) 1014 and/or 1034 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 1016 and/or 1036 may be examples of non-transitory computer-readable media. The memory 1016 and/or 1036 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 1016 and/or memory 1036 may store a perception component 1018, localization component 1020, planning component 1022, map(s) 1024, driving log data 1026, prediction component 1028, and/or system controller(s) 1030—zero or more portions of any of which may be hardware, such as GPU(s), CPU(s), and/or other processing units.

The perception component 1018 may detect object(s) in in an environment surrounding the vehicle 1002 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 1018 is referred to as perception data. The perception component 1018 may be configured to associate a bounding region (or other indication) with an identified object. The perception component 1018 may be configured to associate a confidence score associated with a classification of the identified object with an identified object. In some examples, objects, when rendered via a display, can be colored based on their perceived class. The object classifications determined by the perception component 1018 may distinguish between different object types such as, for example, a passenger vehicle, a pedestrian, a bicyclist, motorist, a delivery truck, a semi-truck, traffic signage, and/or the like.

In at least one example, the localization component 1020 may include hardware and/or software to receive data from the sensor(s) 1006 to determine a position, velocity, and/or orientation of the vehicle 1002 (e.g., one or more of an x-, y-, z-position, roll, pitch, or yaw). For example, the localization component 1020 may include and/or request/receive map(s) 1024 of an environment and can continuously determine a location, velocity, and/or orientation of the autonomous vehicle 1002 within the map(s) 1024. In some instances, the localization component 1020 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 1020 may provide data to various components of the vehicle 1002 to determine an initial position of an autonomous vehicle for generating a trajectory and/or for generating map data, as discussed herein. In some examples, localization component 1020 may provide, to the perception component 1018, a location and/or orientation of the vehicle 1002 relative to the environment and/or sensor data associated therewith.

The planning component 1022 may receive a location and/or orientation of the vehicle 1002 from the localization component 1020 and/or perception data from the perception component 1018 and may determine instructions for controlling operation of the vehicle 1002 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 1030 and/or drive component(s) 1012 may parse/cause to be carried out, second instructions for the emitter(s) 1008 may be formatted according to a second format associated therewith).

The driving log data 1026 may comprise sensor data, perception data, and/or scenario labels collected/determined by the vehicle 1002 (e.g., by the perception component 1018), as well as any other message generated and or sent by the vehicle 1002 during operation including, but not limited to, control messages, error messages, etc. In some examples, the vehicle 1002 may transmit the driving log data 1026 to the computing device(s) 1032. The computing device(s) 1032 may identify one or more scenarios based at least in part on the log data, which may also comprise defining a scenario, wherein the scenarios are used to generate a playback simulation. For example, the computing device(s) 1032 may determine an environmental layout, a number, type, and a configuration of object(s) in the environment and/or associate this definition with one or more portions of log data associated with that scenario. In some examples, the driving log data 1026 may comprise (historical) perception data that was generated on the vehicle 1002 during operation of the vehicle.

The prediction component 1028 may generate one or more probability maps representing prediction probabilities of possible locations of one or more objects in an environment. For example, the prediction component 1028 may generate one or more probability maps for vehicles, pedestrians, animals, and the like within a threshold distance from the vehicle 1002. In some examples, the prediction component 1028 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 1022 may be communicatively coupled to the prediction component 1028 to generate predicted trajectories of objects in an environment. For example, the prediction component 1028 may generate one or more predicted trajectories for objects within a threshold distance from the vehicle 1002. In some examples, the prediction component 1028 may measure a trace of an object and generate a trajectory for the object based on observed and predicted behavior. Although prediction component 1028 is shown on a vehicle 1002 in this example, the prediction component 1028 may also be provided elsewhere, such as in a remote computing device 100, 600. In some embodiments, a prediction component may be provided at both a vehicle and a remote computing device. These components may be configured to operate according to the same or a similar algorithm.

The memory 1016 and/or 1036 may additionally or alternatively store a mapping system, a planning system, a ride management system, etc. Although perception component 1018 and/or planning component 1022 are illustrated as being stored in memory 1016, perception component 1018 and/or planning component 1022 may include processor-executable instructions, machine-learned model(s) (e.g., a neural network), and/or hardware.

As described herein, the localization component 1020, the perception component 1018, the planning component 1022, the simulation system 1038, and/or other components of the system 1000 may comprise one or more ML models. For example, the localization component 1020, the perception component 1018, the planning component 1022, and/or the simulation system 1038 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 1020 may additionally or alternatively store one or more system controller(s) 1030, which may be configured to control steering, propulsion, braking, safety, emitters, communication, and other systems of the vehicle 1002. These system controller(s) 1030 may communicate with and/or control corresponding systems of the drive component(s) 1012 and/or other components of the vehicle 1002.

It should be noted that while FIG. 10 is illustrated as a distributed system, in alternative examples, components of the vehicle 1002 may be associated with the computing device(s) 1032 and/or components of the computing device(s) 1032 may be associated with the vehicle 1002. That is, the vehicle 1002 may perform one or more of the functions associated with the computing device(s) 1032, and vice versa.

EXAMPLE CLAUSES

A: A system comprising: one or more processors; and one or more non-transitory computer-readable media storing computer-executable instructions that, when executed, cause the system to perform operations comprising: receiving log data associated with a vehicle traversing a real-world environment, the log data associated with a first value of a first parameter associated with the environment; determining a modified value of the first parameter associated with a first event, the determining comprising: determining a first intermediate value of the first parameter; determining a first predicted driving scenario based at least in part on the first intermediate value of the first parameter, the predicted driving scenario corresponding to a driving scenario represented in the log data; calculating a first score associated with the first predicted driving scenario, the first score descriptive of proximity to occurrence of the first event in the first predicted driving scenario; determining a second intermediate value of the first parameter; executing a run of a driving simulation based at least in part on the second intermediate value of the first parameter, the driving simulation including a simulation of an object represented in the log data, wherein the simulation of the object is controlled using a planning component; calculating a second score associated with the run of the driving simulation, the second score descriptive of proximity to occurrence of the first event in the run of the driving simulation; and identifying the second intermediate value as the modified value of the first parameter; generating modified log data from the log data based at least in part on the modified value of the first parameter; and training a machine learning model for controlling an autonomous vehicle based at least in part on the modified log data.

B: The system according to clause A or any of clauses AA to DD, wherein the first parameter is associated with conversion of an object represented in the log data to being controlled by a planning component in the driving simulation.

C: The system according to clause A or B or any of clauses AA to DD, the operations comprising identifying the first parameter as contributing to proximity to occurrence of the first event.

D: The system according to any of clauses A to C or any of clauses AA to DD, the operations comprising determining that the second score meets a threshold condition, and/or determining that the second score represents a minimum score.

E: The system according to any of clauses A to D or any of clauses AA to DD, the operations comprising: determining a further modified value of the first parameter; generating further modified log data from the log data, the modified log data based at least in part on the further modified value of the first parameter; and training the machine learning model based at least in part on the further modified log data.

F: A method comprising: receiving log data associated with a vehicle traversing a real-world environment, the log data associated with a first value of a first parameter associated with the environment; inputting the log data into a search algorithm; receiving, from the search algorithm, a first modified value of the first parameter, wherein the search algorithm determines the first modified value of the first parameter based on a first simulation score, the first simulation score associated with occurrence of a first event in a first run of a driving simulation, the first run of the driving simulation including an autonomous vehicle and based at least in part on the first modified value of the first parameter; outputting first modified log data based at least in part on the first modified value of the first parameter; and training a machine learning model for controlling an autonomous vehicle based at least in part on the first modified log data.

G: The method according to clause F or any of clauses EE to LL, wherein the first parameter is associated with a first object in the environment, and wherein during the first run of the driving simulation a first simulated object is controlled to substantially correspond with the first object in the environment based on the log data and the first modified value of the first parameter throughout the driving simulation.

H: The method according to clause F or G or any of clauses EE to LL, wherein the first parameter is associated with a first object in the environment, and wherein the first run of the driving simulation is executed in a first time period and a second time period, wherein during the first time period a first simulated object is controlled to substantially correspond with the first object in the environment based on the log data and the first modified value of the first parameter, and during the second time period the first simulated object is controlled using a planning component.

I: The method according to any of clauses F to H or any of clauses EE to LL, further comprising determining a search range defining permitted values of the first parameter, and providing the search range to the search algorithm as a constraint.

J: The method according to any of clauses F to I or any of clauses EE to LL, comprising determining the search range based at least in part on map data associated with the environment, an environmental attribute associated with the environment, or values of the first parameter in additional log data associated with additional objects in the environment.

K: The method according to any of clauses F to J or any of clauses EE to LL, comprising rejecting a value of the first parameter as the modified value based on association of said value with a rejection criterion.

L: The method according to any of clauses F to K or any of clauses EE to LL, further comprising requesting the log data based on an estimated likelihood of a driving sequence associated with the log data occurring in the real-world environment.

M: The method according to any of clauses F to L or any of clauses EE to LL, wherein the log data is measured by sensors of the vehicle traversing the real-world environment.

N: One or more non-transitory computer-readable media storing instructions executable by one or more processors, wherein the instructions, when executed, cause the one or more processors to perform operations comprising: receiving log data associated with a vehicle traversing a real-world environment, the log data associated with a first value of a first parameter associated with the environment; inputting the log data into a search algorithm; receiving, from the search algorithm, a first modified value of the first parameter, wherein the search algorithm determines the first modified value of the first parameter based on a first simulation score, the first simulation score associated with occurrence of a first event in a first run of a driving simulation, the first run of the driving simulation including an autonomous vehicle and based at least in part on the first modified value of the first parameter; outputting first modified log data based at least in part on the first modified value of the first parameter; and training a machine learning model for controlling an autonomous vehicle based at least in part on the first modified log data.

O: The one or more non-transitory computer-readable media according to clause N or any of clauses MM to TT, wherein the first event is associated with an overlap between a representation in the first run of the driving simulation of a first object in the environment and a representation in the first run of the driving simulation of a second object in the environment.

P: The one or more non-transitory computer-readable media according to clause N or O or any of clauses MM to TT, wherein the first parameter is associated with a geometric attribute associated with a first object in the environment, a speed associated with the first object, metadata associated with the first object, an environmental attribute associated with the environment; a map attribute associated with the environment, a temporal attribute associated with the environment; or a conversion of an object represented in the log data to being controlled by a planning component in the driving simulation.

Q: The one or more non-transitory computer-readable media according to any of clauses N to P or any of clauses MM to TT, wherein the search performs a directed search to determine the first modified value of the first algorithm.

R: The one or more non-transitory computer-readable media according to any of clauses N to Q or any of clauses MM to TT, wherein the log data comprises a second value of a second parameter associated with the environment, and wherein the operations comprise: receiving, from the search algorithm, a second modified value of the second parameter, wherein the search algorithm determines the second modified value of the second parameter based on a second simulation score, the second simulation score associated with occurrence of the first event in a second run of the driving simulation, the second run of the driving simulation based at least in part on the second modified value of the second parameter; and outputting second modified log data based at least in part on the second modified value of the first parameter.

S: The one or more non-transitory computer-readable media according to any of clauses N to R or any of clauses MM to TT, the operations comprising: receiving, from the search algorithm, a set of modified values of the first parameter and the second parameter associated with occurrence of the first event.

T: The one or more non-transitory computer-readable media according to any of clauses N to S or any of clauses MM to TT, the operations comprising requesting the log data based on a driving sequence associated with the log data.

U: The one or more non-transitory computer-readable media according to any of clauses N to T or any of clauses MM to TT, wherein the log data comprises an initial value of a second parameter associated with the environment, wherein the modified log data comprises the initial value of the second parameter.

AA: A system comprising: one or more processors; and one or more non-transitory computer-readable media storing computer-executable instructions that, when executed, cause the system to perform operations comprising: receiving first log data associated with a vehicle traversing a real-world environment, the first log data associated with a first value of a first parameter associated with the environment; training a machine learning model for controlling an autonomous vehicle based at least in part on the first log data; determining a first modified value of the first parameter associated with a first event, the determining comprising: determining a first intermediate value of the first parameter; executing a first run of a driving simulation including a simulated autonomous vehicle, wherein the first run of the driving simulation is based at least in part on the first intermediate value of the first parameter; calculating a first score associated with the first run of the driving simulation, the first score descriptive of proximity to occurrence of the first event in the first run of the driving simulation; determining, based at least in part on the first score, a second intermediate value of the first parameter; executing a second run of the driving simulation, wherein the second run of the driving simulation is based at least in part on the second intermediate value of the first parameter; calculating a second score associated with the second run of the driving simulation, the second score descriptive of proximity to occurrence of the first event in the second run of the driving simulation; and identifying the second intermediate value as the modified value of the first parameter; generating first modified log data from the first log data, the first modified log data based at least in part on the first modified value of the first parameter; and using the first modified log data to test or validate the machine learning model for controlling an autonomous vehicle.

BB: The system according to clause AA or any of clauses A to E, the operations comprising determining that the second score meets a threshold condition, wherein the threshold condition is based at least in part on a score descriptive of proximity to occurrence of the first event in the first log data.

CC: The system according to clause AA or BB or any of clauses A to E, wherein the first log data comprises a second value of a second parameter associated with the environment, and wherein the operations comprise: determining a second modified value of the second parameter associated with the first event; generating second modified log data from the first log data, the second modified log data comprising the second modified value of the first parameter; and using the second modified log data to test or validate the machine learning model for controlling an autonomous vehicle.

DD: The system according to any of clauses AA to CC or any of clauses A to E, the operations further comprising: determining a metric for the machine learning model based at least in part on testing or validating the machine learning model using the first modified log data and the second modified log data.

EE: A method comprising: receiving first log data associated with a vehicle traversing a real-world environment, the first log data associated with a first value of a first parameter associated with the environment; inputting the first log data into a search algorithm; receiving, from the search algorithm, a first modified value of the first parameter, wherein the search algorithm determines the first modified value of the first parameter based on a first simulation score, the first simulation score associated with occurrence of a first event in a first run of a driving simulation, the first run of the driving simulation including an autonomous vehicle and based at least in part on the first modified value of the first parameter; and outputting the first modified value of the first parameter for testing or validating a machine learning model for controlling an autonomous vehicle.

FF: The method according to clause EE or any of clauses F to M, comprising determining a metric descriptive of the machine learning model or a metric descriptive of the first log data based at least in part on the first modified value.

GG: The method according to clause EE or FF or any of clauses F to M, comprising determining a metric descriptive of the machine learning model or a metric descriptive of the first log data based at least in part on the first modified value and an estimated likelihood of occurrence of the first modified value in the real-world environment.

HH: The method according to any of clauses EE to GG or any of clauses F to M, wherein the first log data comprises a second value of a second parameter associated with the environment, and wherein the method comprises receiving, from the search algorithm, a second modified value of the second parameter.

II: The method according to clause EE or HH or any of clauses F to M, wherein the first run of the driving simulation is based at least in part on the first modified value of the first parameter and the second modified value of the second parameter.

JJ: The method according to clause EE or II or any of clauses F to M comprising defining, based at least in part on the first modified value of the first parameter and the second modified value of the second parameter, a surface in a parameter space descriptive of proximity of the first log data to occurrence of the first event.

KK: The method according to clause EE or JJ or any of clauses F to M, comprising testing or validating the machine learning model based at least in part on the first modified value of the first parameter.

LL: The method according to clause EE or KK or any of clauses F to M, wherein the first log data is measured by one or more sensors of the vehicle traversing the real-world environment.

MM: One or more non-transitory computer-readable media storing instructions executable by one or more processors, wherein the instructions, when executed, cause the one or more processors to perform operations comprising: receiving first log data associated with a vehicle traversing a real-world environment, the first log data comprising a first value of a first parameter associated with the environment; inputting the first log data into a search algorithm; receiving, from the search algorithm, a first modified value of the first parameter, wherein the search algorithm determines the first modified value of the first parameter based on a first simulation score, the first simulation score associated with occurrence of a first event in a first run of a driving simulation, the first run of the driving simulation including an autonomous vehicle and based at least in part on the first modified value of the first parameter; and outputting the first modified value of the first parameter for testing or validating a machine learning model for controlling an autonomous vehicle.

NN: The one or more non-transitory computer-readable media according to clause MM or any of clauses N to U, wherein the operations comprise generating modified log data based at least in part on the first modified value of the first parameter.

OO: The one or more non-transitory computer-readable media according to clause MM or NN or any of clauses N to U, wherein the operations comprise testing or validating the machine learning model based at least in part on the modified log data.

PP: The one or more non-transitory computer-readable media according to any of clauses MM to OO or any of clauses N to U, wherein the operations comprise training the machine learning model based at least in part on the first log data.

QQ: The one or more non-transitory computer-readable media according to any of clauses MM to PP or any of clauses N to U, wherein the first event is associated with an overlap adverse event between a representation in the first run of the driving simulation of a first object in the environment and a representation in the first run of the driving simulation of a second object in the environment.

RR: The one or more non-transitory computer-readable media according to any of clauses MM to QQ or any of clauses N to U, wherein the first simulation score is associated with a proximal-encroachment time at a first simulated location between a representation of a first object in the first run of the driving simulation and a representation of a second object in the first run of the driving simulation.

SS: The one or more non-transitory computer-readable media according to any of clauses MM to RR or any of clauses N to U, wherein the search algorithm performs a directed search to determine the modified value.

TT: The one or more non-transitory computer-readable media according to any of clauses MM to SS or any of clauses N to U, wherein the first parameter is associated with a geometric attribute associated with a first object in the environment, a speed associated with the first object, metadata associated with the first object, an environmental attribute associated with the environment, a map attribute associated with the environment, a temporal attribute associated with the environment; or a conversion of an object represented in the log data to being controlled by a planning component in the driving simulation.

While the example clauses described above are described with respect to one particular implementation, it should be understood that, in the context of this document, the content of the example clauses can also be implemented via a method, device, system, computer-readable medium, and/or another implementation. Additionally, any of examples A-TT may be implemented alone or in combination with any other one or more of the examples A-TT.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could." "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

receiving first log data, the first log data based at least in part on sensor data generated by a vehicle traversing a real-world environment, the first log data comprising a first value of a first parameter associated with the environment;

training a machine learning model for controlling an autonomous vehicle based at least in part on the first log data;

determining a first modified value of the first parameter associated with a first event, the first modified value of the first parameter different to the first value of the first parameter in the first log data, the determining comprising:

determining a first intermediate value of the first parameter;

executing a first run of a driving simulation including a simulated autonomous vehicle, wherein the first run of the driving simulation is based at least in part on the first intermediate value of the first parameter;

calculating a first score associated with the first run of the driving simulation, the first score descriptive of proximity to occurrence of the first event in the first run of the driving simulation, the first event associated with an overlap adverse event between a representation in the first run of the driving simulation of a first object in the environment and a representation in the first run of the driving simulation of a second object in the environment;

determining, based at least in part on the first score, a second intermediate value of the first parameter;

executing a second run of the driving simulation, wherein the second run of the driving simulation is based at least in part on the second intermediate value of the first parameter;

calculating a second score associated with the second run of the driving simulation, the second score descriptive of proximity to occurrence of the first event in the second run of the driving simulation; and identifying the second intermediate value as the first modified value of the first parameter;

generating first modified log data from the first log data, the first modified log data based at least in part on the first modified value of the first parameter; and using the first modified log data to test or validate the machine learning model for controlling an autonomous vehicle.

2. The system of claim 1, the operations comprising determining that the second score meets a threshold condition, wherein the threshold condition is based at least in part on a score descriptive of proximity to occurrence of the first event in the first log data.

3. The system of claim 1, wherein the first log data comprises a second value of a second parameter associated with the environment, and wherein the operations comprise:

determining a second modified value of the second parameter associated with the first event;

generating second modified log data from the first log data, the second modified log data comprising the second modified value of the first parameter; and using the second modified log data to test or validate the machine learning model for controlling an autonomous vehicle.

4. The system of claim 3, the operations further comprising:

determining a metric for the machine learning model based at least in part on testing or validating the machine learning model using the first modified log data and the second modified log data.

5. A method comprising:

receiving first log data associated with a vehicle traversing a real-world environment, the first log data associated with a first value of a first parameter associated with the environment;

inputting the first log data into a search algorithm;

receiving, from the search algorithm, a first modified value of the first parameter, wherein the search algorithm determines the first modified value of the first parameter based on a first simulation score, the first simulation score associated with occurrence of a first event in a first run of a driving simulation, the first run of the driving simulation including an autonomous vehicle and based at least in part on the first modified value of the first parameter, the first event associated with an overlap adverse event between a representation in the first run of the driving simulation of a first object in the environment and a representation in the first run of the driving simulation of a second object in the environment; and outputting the first modified value of the first parameter for testing or validating a machine learning model for controlling an autonomous vehicle.

6. The method of claim 5, comprising determining a metric descriptive of the machine learning model or a metric descriptive of the first log data based at least in part on the first modified value.

7. The method of claim 5, comprising determining a metric descriptive of the machine learning model or a metric descriptive of the first log data based at least in part on the first modified value and an estimated likelihood of occurrence of the first modified value in the real-world environment.

8. The method of claim 5, wherein the first log data comprises a second value of a second parameter associated with the environment, and wherein the method comprises receiving, from the search algorithm, a second modified value of the second parameter.

9. The method of claim 8, wherein the first run of the driving simulation is based at least in part on the first modified value of the first parameter and the second modified value of the second parameter.

10. The method of claim 8 comprising defining, based at least in part on the first modified value of the first parameter and the second modified value of the second parameter, a surface in a parameter space descriptive of proximity of the first log data to occurrence of the first event.

11. The method of claim 5, comprising testing or validating the machine learning model based at least in part on the first modified value of the first parameter.

12. The method of claim 5, wherein the first log data is measured by one or more sensors of the vehicle traversing the real-world environment.

13. One or more non-transitory computer-readable media storing instructions executable by one or more processors, wherein the instructions, when executed, cause the one or more processors to perform operations comprising:

receiving first log data associated with a vehicle traversing a real-world environment, the first log data comprising a first value of a first parameter associated with the environment;

inputting the first log data into a search algorithm;

receiving, from the search algorithm, a first modified value of the first parameter, wherein the search algorithm determines the first modified value of the first parameter based on a first simulation score, the first simulation score associated with occurrence of a first event in a first run of a driving simulation, the first run of the driving simulation including an autonomous vehicle and based at least in part on the first modified value of the first parameter, the first simulation score associated with a proximal-encroachment time at a first simulated location between a representation of a first object in the first run of the driving simulation and a representation of a second object in the first run of the driving simulation; and outputting the first modified value of the first parameter for testing or validating a machine learning model for controlling an autonomous vehicle.

14. The one or more non-transitory computer-readable media of claim 13, wherein the operations comprise generating modified log data based at least in part on the first modified value of the first parameter.

15. The one or more non-transitory computer-readable media of claim 14, wherein the operations comprise testing or validating the machine learning model based at least in part on the modified log data.

16. The one or more non-transitory computer-readable media of claim 13, wherein the operations comprise training the machine learning model based at least in part on the first log data.

17. The one or more non-transitory computer-readable media of claim 13, wherein the first event is associated with an overlap adverse event between a representation in the first run of the driving simulation of a first object in the environment and a representation in the first run of the driving simulation of a second object in the environment.

18. The one or more non-transitory computer-readable media of claim 13, wherein the search algorithm performs a directed search to determine the modified value.

19. The one or more non-transitory computer-readable media of claim 13, wherein the first parameter is associated with a geometric attribute associated with a first object in the environment, a speed associated with the first object, metadata associated with the first object, an environmental attribute associated with the environment, a map attribute associated with the environment, a temporal attribute associated with the environment; or a conversion of an object represented in the log data to being controlled by a planning component in the driving simulation.

20. The method of claim 5, wherein the first simulation score is associated with a proximal-encroachment time at a first simulated location between a representation of a first object in the first run of the driving simulation and a representation of a second object in the first run of the driving simulation.

* * * * *